United States Patent
Gilbertson et al.

(10) Patent No.: US 12,272,044 B2
(45) Date of Patent: Apr. 8, 2025

(54) PRODUCTION LINE CONFORMANCE MEASUREMENT TECHNIQUES USING CATEGORICAL VALIDATION MACHINE LEARNING MODELS

(71) Applicant: Optum, Inc., Minnetonka, MN (US)

(72) Inventors: Thomas R. Gilbertson, Hartford, CT (US); Raja Mukherji, Dublin (IE); Haylea Tricia Northcott, Simsbury, CT (US); Karen Harte, Avon, CT (US); Colby A. Wright, Chandler, AZ (US)

(73) Assignee: Optum, Inc., Minnetonka, MN (US)

( * ) Notice: Subject to any disclaimer, the term of this patent is extended or adjusted under 35 U.S.C. 154(b) by 828 days.

(21) Appl. No.: 17/475,987

(22) Filed: Sep. 15, 2021

(65) Prior Publication Data

US 2022/0327689 A1     Oct. 13, 2022

Related U.S. Application Data

(60) Provisional application No. 63/171,779, filed on Apr. 7, 2021.

(51) Int. Cl.
*G06T 7/00* (2017.01)
*G06F 18/21* (2023.01)
(Continued)

(52) U.S. Cl.
CPC .......... *G06T 7/0008* (2013.01); *G06F 18/217* (2023.01); *G06N 3/08* (2013.01); *G06T 7/11* (2017.01); *G06T 2207/20132* (2013.01)

(58) Field of Classification Search
CPC .............. G06T 7/0008; G06T 7/11; G06T 2207/20132; G06F 18/217; G06N 3/08;
(Continued)

(56) References Cited

U.S. PATENT DOCUMENTS

| 6,535,637 B1 | 3/2003 | Wootton et al. |
| 6,771,369 B2 | 8/2004 | Rzasa et al. |

(Continued)

FOREIGN PATENT DOCUMENTS

| AU | 2021266673 A1 | 12/2022 |
| CN | 116758525 A | 9/2023 |
| WO | 2021/041948 A1 | 3/2021 |

OTHER PUBLICATIONS

Yuen Fei Wong, Hoi Ting Ng, Kit Yee Leung, Ka Yan Chan, Sau Yi Chan, Chen Change Loy, "Development of fine-grained pill identification algorithm using deep convolutional network," Journal of Biomedical Informatics, vol. 74, Oct. 2017.*

(Continued)

Primary Examiner — Wesley J Tucker
(74) Attorney, Agent, or Firm — Alston & Bird LLP

(57) ABSTRACT

Various embodiments of the present invention provide methods, apparatus, systems, computing devices, computing entities, and/or the like for production line conformance monitoring. For example, certain embodiments of the present invention utilize systems, methods, and computer program products that perform production line conformance monitoring by utilizing categorical validation machine learning models that are generated using a plurality of training production line images associated with a related category subset of a plurality of validation categories for a target validation category.

16 Claims, 11 Drawing Sheets

(51) Int. Cl.
*G06N 3/08* (2023.01)
*G06T 7/11* (2017.01)

(58) Field of Classification Search
CPC ........ G06N 3/082; G06N 3/09; G06N 3/0464; G06N 3/084; G06V 10/82; G06V 20/52; G06V 20/60
See application file for complete search history.

(56) References Cited

U.S. PATENT DOCUMENTS

| | | | |
|---|---|---|---|
| 7,111,780 B2 | 9/2006 | Broussard et al. | |
| 8,131,107 B2 | 3/2012 | Sun et al. | |
| 8,571,297 B2 | 10/2013 | Eller et al. | |
| 9,098,900 B2 | 8/2015 | Helgason et al. | |
| 9,501,887 B2 | 11/2016 | Berg et al. | |
| 9,506,903 B2 | 11/2016 | Guthrie et al. | |
| 9,811,632 B2 | 11/2017 | Grabiner et al. | |
| 9,994,347 B2 * | 6/2018 | Yuyama | B65B 57/16 |
| 10,467,477 B2 | 11/2019 | Gershtein et al. | |
| 10,713,540 B2 | 7/2020 | Zhang et al. | |
| 10,872,688 B2 | 12/2020 | Swarvar et al. | |
| 10,896,764 B2 | 1/2021 | Yonaha et al. | |
| 11,922,673 B2 * | 3/2024 | Liu | G06T 7/11 |
| 12,051,187 B2 * | 7/2024 | Tae | G06N 5/01 |
| 2007/0036429 A1 | 2/2007 | Terakawa | |
| 2009/0055116 A1 * | 2/2009 | Chen | G01N 21/9508 702/82 |
| 2017/0305589 A1 | 10/2017 | Yuyama et al. | |
| 2018/0260665 A1 | 9/2018 | Zhang et al. | |
| 2020/0404196 A1 * | 12/2020 | Holmes | G06V 10/143 |
| 2021/0216062 A1 * | 7/2021 | Hsiao | G05B 19/4183 |
| 2021/0350188 A1 * | 11/2021 | Lamberti | G06V 10/82 |
| 2022/0222807 A1 * | 7/2022 | Tae | G06T 7/0004 |
| 2022/0327689 A1 | 10/2022 | Gilbertson et al. | |
| 2022/0358755 A1 * | 11/2022 | Gala | G06F 18/24143 |
| 2023/0096532 A1 * | 3/2023 | Tsubaki | G06T 1/0007 382/141 |
| 2023/0140779 A1 * | 5/2023 | Bouthiette | G07F 17/0092 53/443 |
| 2024/0071059 A1 * | 2/2024 | Schreiner | G06F 18/217 |
| 2024/0249809 A1 * | 7/2024 | Daniels | G16H 40/20 |

OTHER PUBLICATIONS

"Smart Pill ID: Identify Pills With Your Camera," Google Play, (article, online), (4 pages), [Retrieved from the Internet Apr. 12, 2001] <URL: https://play.google.com/store/apps/details?id=com.iconiqStudios.pillID&hi=en_US&gl=US>.

Bianco, Simon et al. "Improving CNN-Based Texture Classification by Color Balancing," Journal of Imaging, vol. 3, Issue 3, Jul. 27, 2017, pp. 1-15, DOI: 10.3390/jimaging3030033.

Cucchiara, Rita et al. "Improving Shadow Suppression in Moving Object Detection With HSV Color Information," ITSC 2001. 2001 IEEE Intelligent Transportation Systems. Proceedings (Cat. No. 01TH8585), Feb. 2001, (6 pages), DOI: 10.1109/ITSC.2001.948679.

Delgado, Natalia Larios et al. "Fast and Accurate Medication Identification," Nature Partner Journals—Digital Medicine, vol. 2, No. 10, Feb. 28, 2019, pp. 1-9, DOI: 10.1038.s41746-019-0086-0.

Murali, Saritha et al. "Shadow Detection and Removal From a Single Image Using LAB Color Space," Cybernetics and Information Technologies, vol. 13, No. 1, Mar. 2013, pp. 95-103, DOI: 10.2478/cait-2013-0009.

Novak, Matt. "Erectile Dysfunction Drug and Anti-Depressant Accidentally Swapped in Factory," Gizmodo, Dec. 10, 2020, (7 pages), [Retrieved from the Internet Dec. 29, 2021] <URL: https://gizmodo.com/erectile-dysfunction-drug-and-anti-depressant-accidenta-1845848785>.

Pisano, Etta D. et al. "Contrast Limited Adaptive Histogram Equalization Image Processing to Improve the Detection of Simulated Spiculations in Dense Mammograms," Journal of Digital Imaging, vol. 11, No. 4, Nov. 1998, pp. 193-200.

Reinhard, Erik et al. "Color Transfer Between Images," in IEEE Engineering in Medicine and Biology Magazine: The Quarterly Magazine of the Engineering in Medicine & Biology Society, vol. 21, No. 5, Sep.-Oct. 2001, pp. 34-41, DOI: 10.1109/38.946629.

Shorten, Connor et al. "A Survey on Image Data Augmentation for Deep Learning," Journal of Big Data, vol. 6, No. 60, Jul. 6, 2019, pp. 1-48. DOI: 10.1186/s40537-019-0197-0.pdf.

Sihn, Minchul et al. "Baseline CNN Structure Analysis for Facial Expression Recognition," arXiv Preprint arXiv:1611.04251v1 [cs.CV] Nov. 14, 2016, (6 pages), DOI: 10.1109/ROMAN.2016.7745199.

Zheng, Lihong et al. "An Algorithm for Accuracy Enhancement of License Plate Recognition," Journal of Computer and System Sciences, vol. 79, Issue 2, Mar. 2013, pp. 245-255, DOI: 10.1016/j.jcss.2012.05.006.

Ozmermer, et al., "VeriMedi: Pill Identification using Proxy-based Deep Metric Learning and Exact Solution", ResearchGate, (32 pages), Apr. 2021, DOI: 10.48550/arXiv.2104.11231.

Kwon, et al., "Pill Detection Model for Medicine Inspection Based on Deep Learning", Chemosensors, vol. 10, No. 4, (2022), doi.org/10.3390/chemosensors10010004.

Reinhard, et al., "Color Transfer Between Images", IEEE Computer Graphics and Applications, vol. 21, No. 5, pp. 34-41, Sep. 2001.

Zheng, et al., "An Algorithm for Accuracy Enhancement of License Plate Recognition", Journal of Computer and System Sciences, vol. 79, pp. 245-255, May 9, 2012.

* cited by examiner

PRODUCTION LINE CONFORMANCE MEASUREMENT TECHNIQUES USING CATEGORICAL VALIDATION MACHINE LEARNING MODELS

CROSS-REFERENCES TO RELATED APPLICATION(S)

The present application claims priority to U.S. Provisional Patent Application No. 63/171,779, filed Apr. 7, 2021, which is incorporated by reference herein in its entirety.

BACKGROUND

Various embodiments of the present invention address technical challenges related to performing production line conformance monitoring and address the efficiency and reliability shortcomings of existing production line conformance monitoring solutions.

BRIEF SUMMARY

In general, embodiments of the present invention provide methods, apparatus, systems, computing devices, computing entities, and/or the like for production line conformance monitoring. For example, certain embodiments of the present invention utilize systems, methods, and computer program products that perform production line conformance monitoring by utilizing categorical validation machine learning models that are generated using a plurality of training production line images associated with a related category subset of a plurality of validation categories for a target validation category.

In accordance with one aspect, a method is provided. In one embodiment, the method comprises: determining a plurality of image attributes for the input production line image, wherein: (i) the plurality of image attributes comprise a product type identifier for the input production line image and one or more physical production attributes for the input production line image, and (ii) the validation category is characterized by a defined subset of the plurality of image attributes; determining, based at least in part on the one or more physical production attributes and by utilizing a categorical validation machine learning model that is associated with the target validation category, the validation prediction, wherein the categorical validation machine learning model is generated using a plurality of training production line images associated with a related category subset of the plurality of validation categories for the target validation category; and performing one or more prediction-based actions based at least in part on the validation prediction.

In accordance with another aspect, a computer program product is provided. The computer program product may comprise at least one computer-readable storage medium having computer-readable program code portions stored therein, the computer-readable program code portions comprising executable portions configured to: determine a plurality of image attributes for the input production line image, wherein: (i) the plurality of image attributes comprise a product type identifier for the input production line image and one or more physical production attributes for the input production line image, and (ii) the validation category is characterized by a defined subset of the plurality of image attributes; determine, based at least in part on the one or more physical production attributes and by utilizing a categorical validation machine learning model that is associated with the target validation category, the validation prediction, wherein the categorical validation machine learning model is generated using a plurality of training production line images associated with a related category subset of the plurality of validation categories for the target validation category; and perform one or more prediction-based actions based at least in part on the validation prediction.

In accordance with yet another aspect, an apparatus comprising at least one processor and at least one memory including computer program code is provided. In one embodiment, the at least one memory and the computer program code may be configured to, with the processor, cause the apparatus to: determine a plurality of image attributes for the input production line image, wherein: (i) the plurality of image attributes comprise a product type identifier for the input production line image and one or more physical production attributes for the input production line image, and (ii) the validation category is characterized by a defined subset of the plurality of image attributes; determine, based at least in part on the one or more physical production attributes and by utilizing a categorical validation machine learning model that is associated with the target validation category, the validation prediction, wherein the categorical validation machine learning model is generated using a plurality of training production line images associated with a related category subset of the plurality of validation categories for the target validation category; and perform one or more prediction-based actions based at least in part on the validation prediction.

BRIEF DESCRIPTION OF THE DRAWINGS

Figure 1:
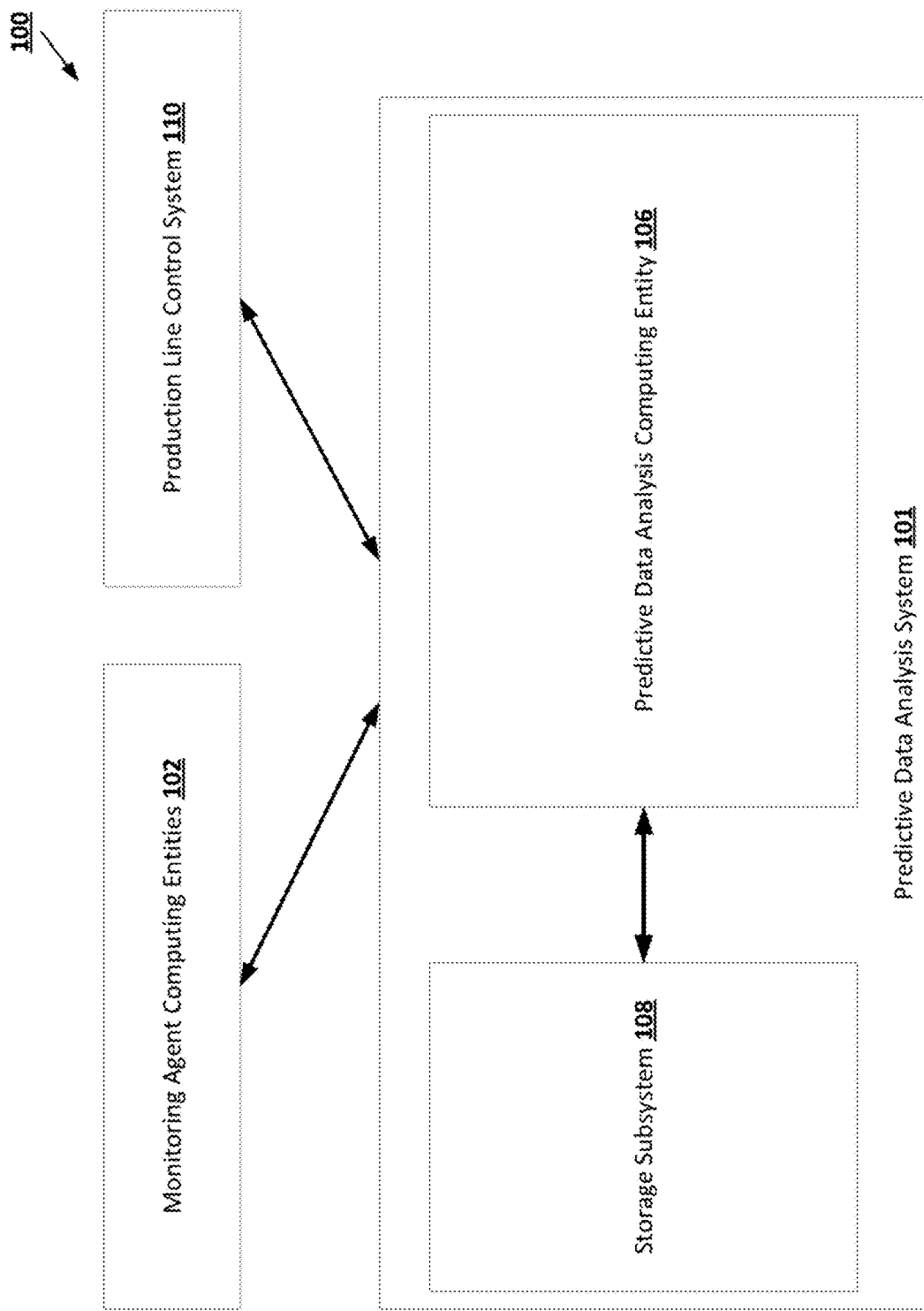

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
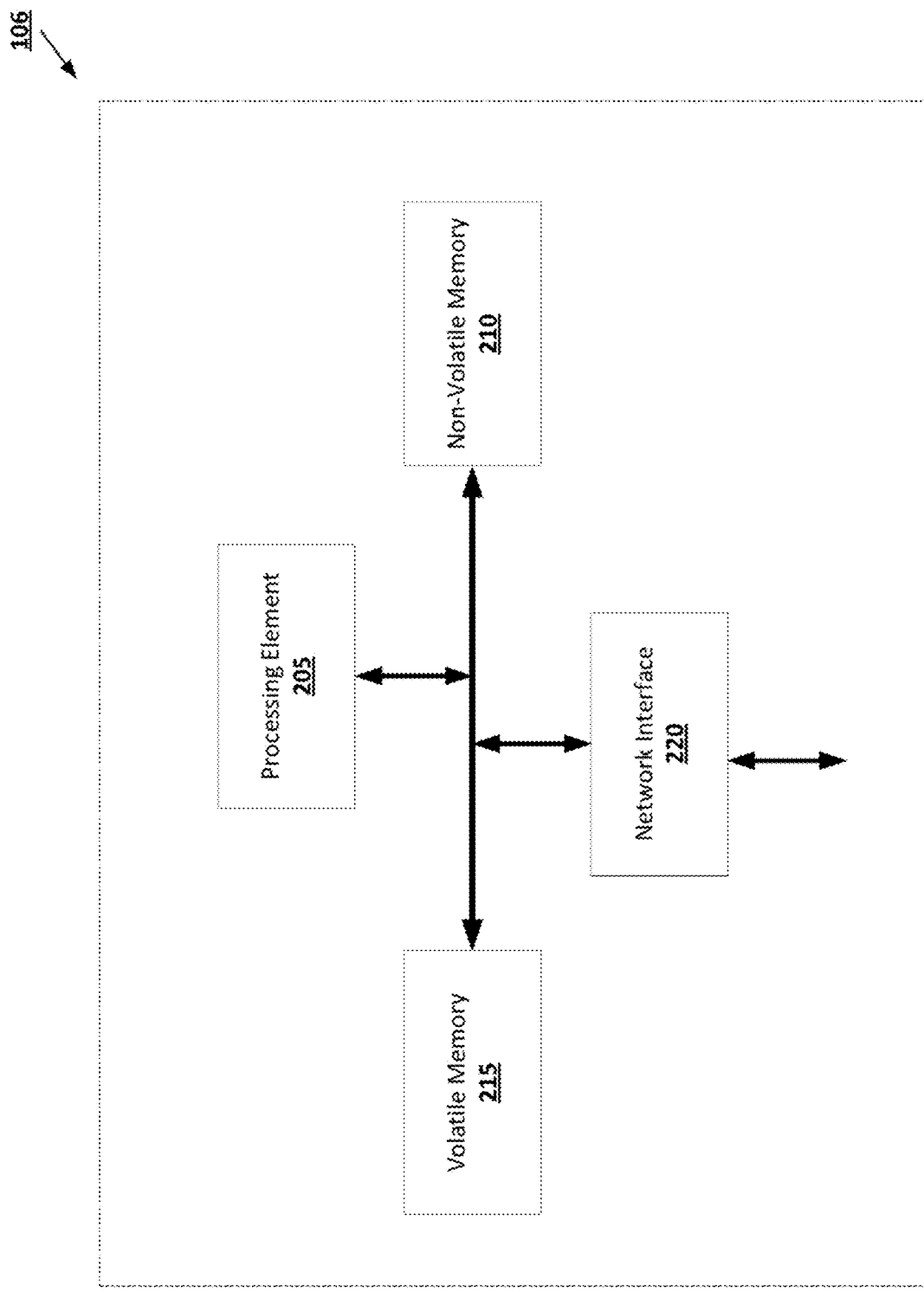

FIG. 2 provides an example predictive data analysis computing entity in accordance with some embodiments discussed herein.

Figure 3:
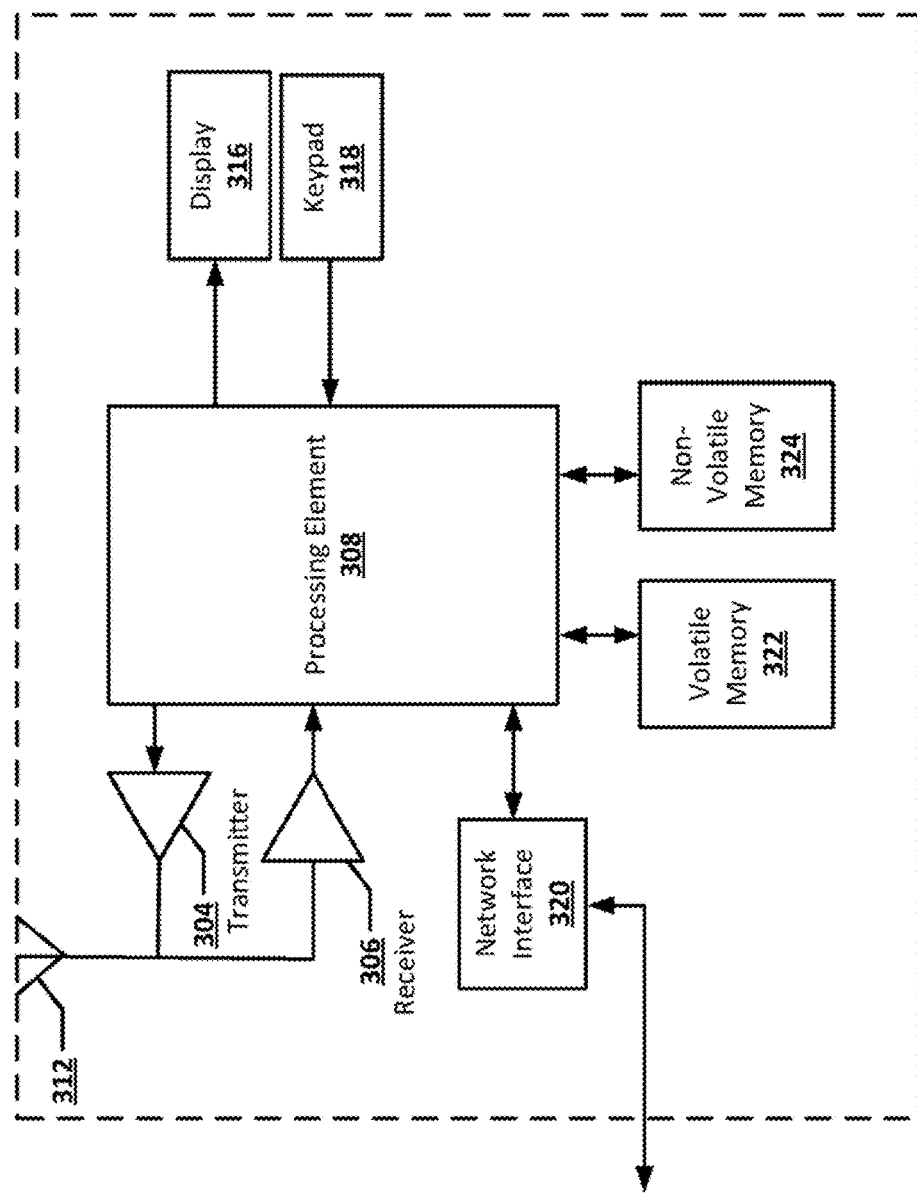

FIG. 3 provides an example monitoring agent computing entity in accordance with some embodiments discussed herein.

Figure 4:
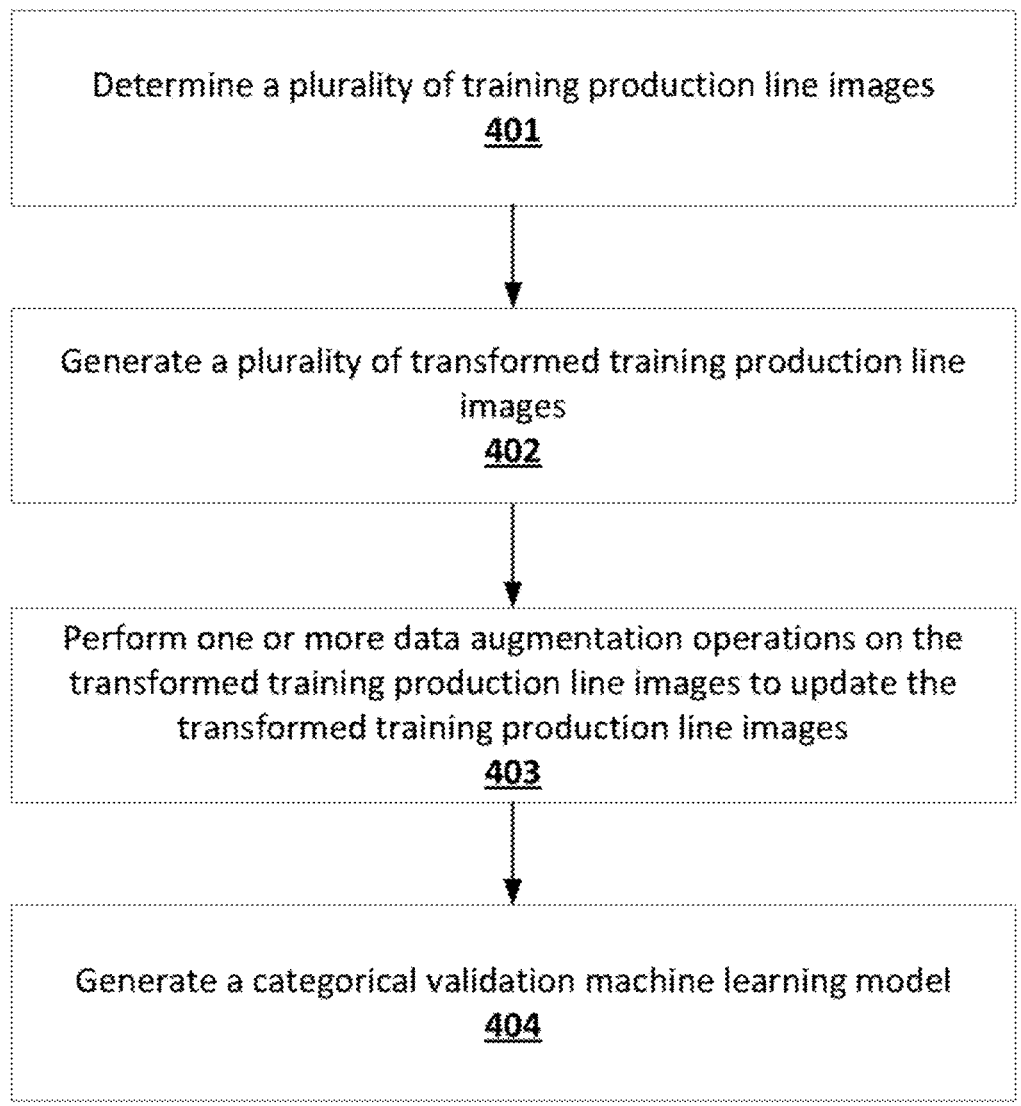

FIG. 4 is a flowchart diagram of an example process for generating a categorical validation machine learning model for a target validation category in accordance with some embodiments discussed herein.

Figure 5:
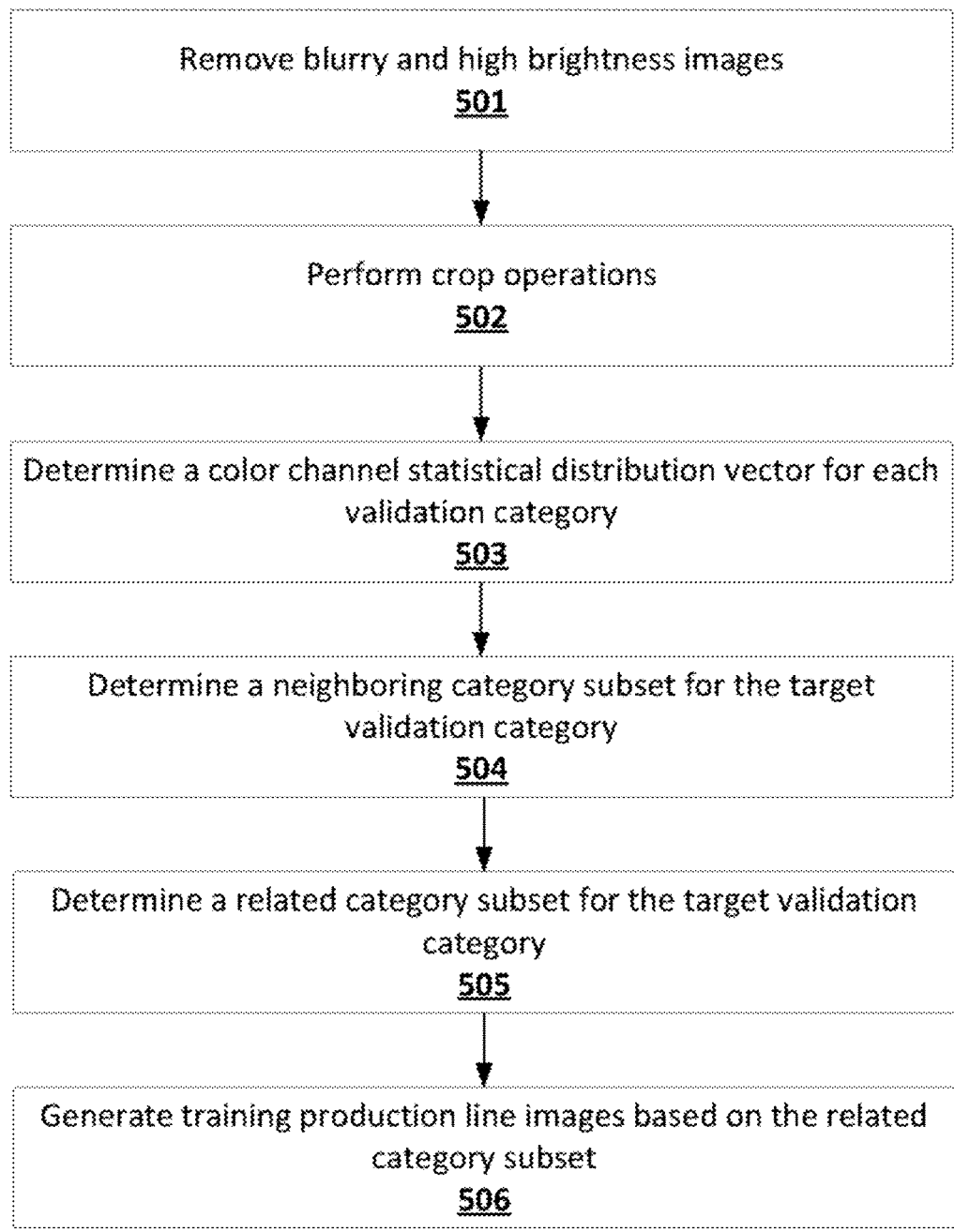

FIG. 5 is a flowchart diagram of an example process for generating a plurality of training production line images in accordance with some embodiments discussed herein.

Figure 6:
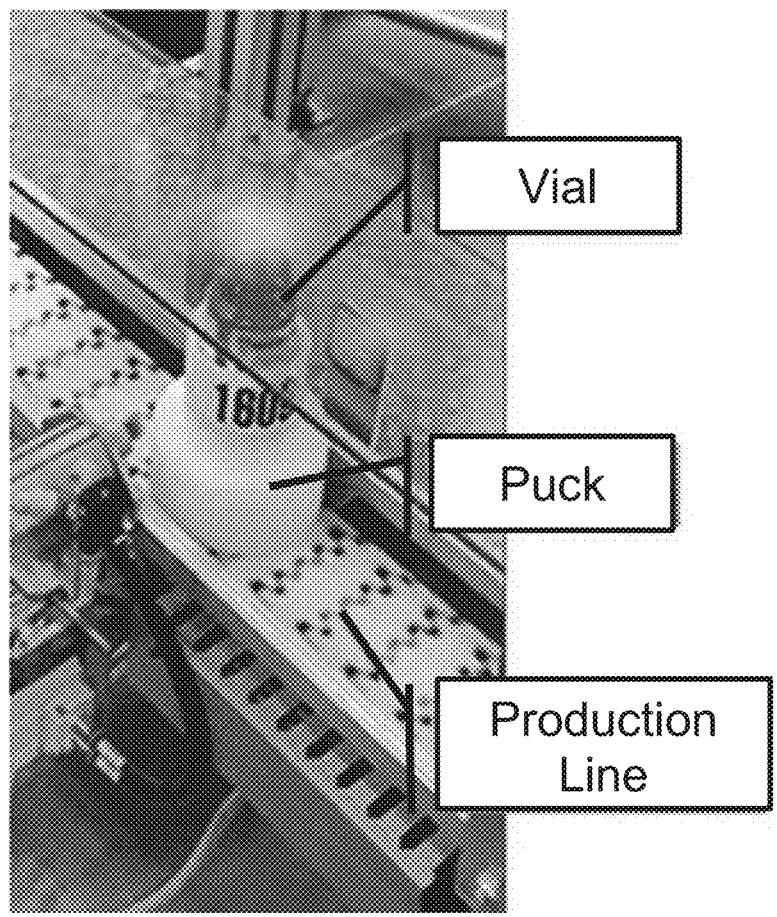

FIG. 6 provides an operational example of a radio frequency controlled container in a production line in accordance with some embodiments discussed herein.

Figure 7:

FIG. 7 provides an operational example of a production line image in accordance with some embodiments discussed herein.

Figure 8:
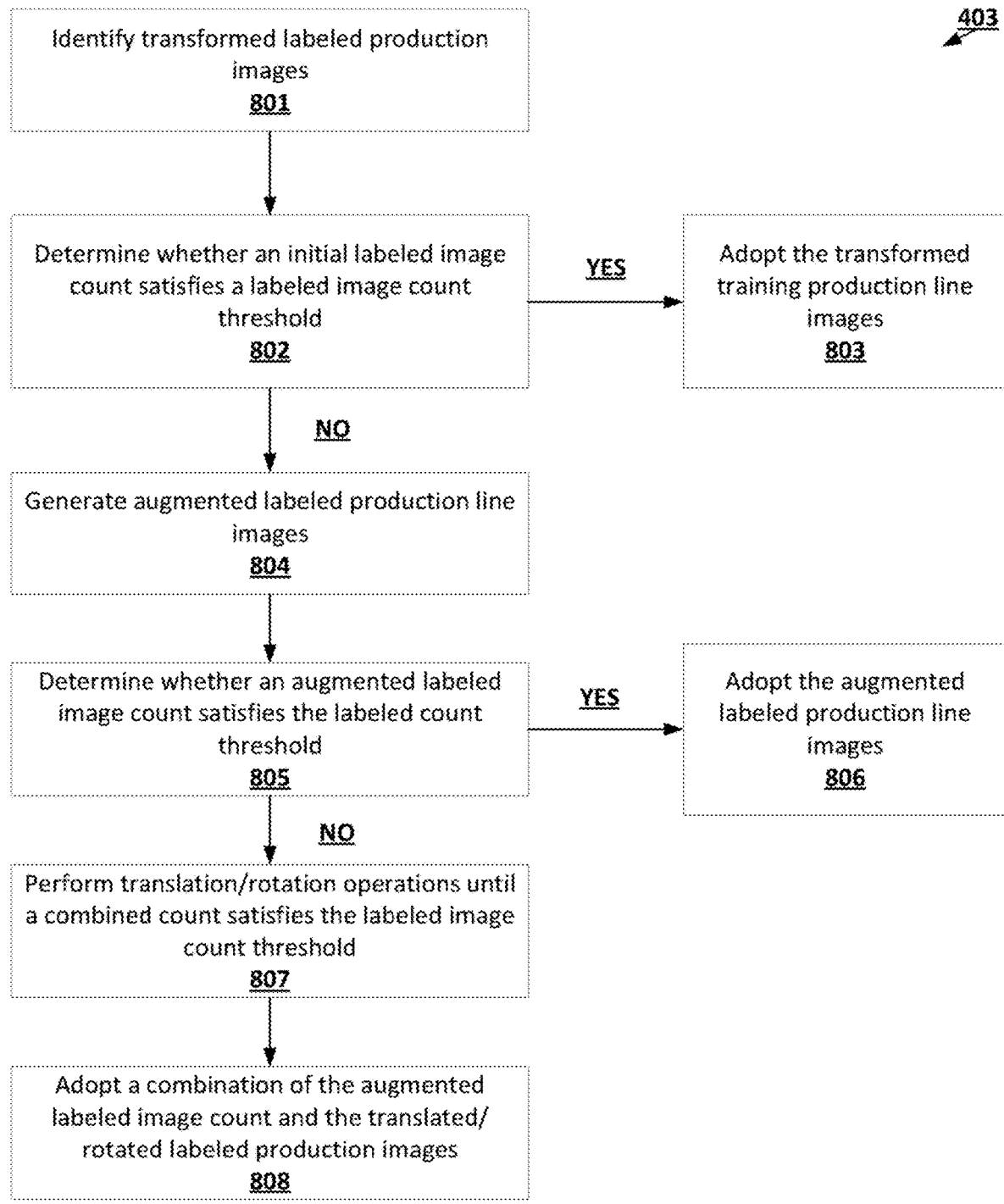

FIG. 8 is a flowchart diagram of an example process for performing one or more data augmentation operations on a set of transformed training production line images to update the set of transformed training production line images in accordance with some embodiments discussed herein.

Figure 9:
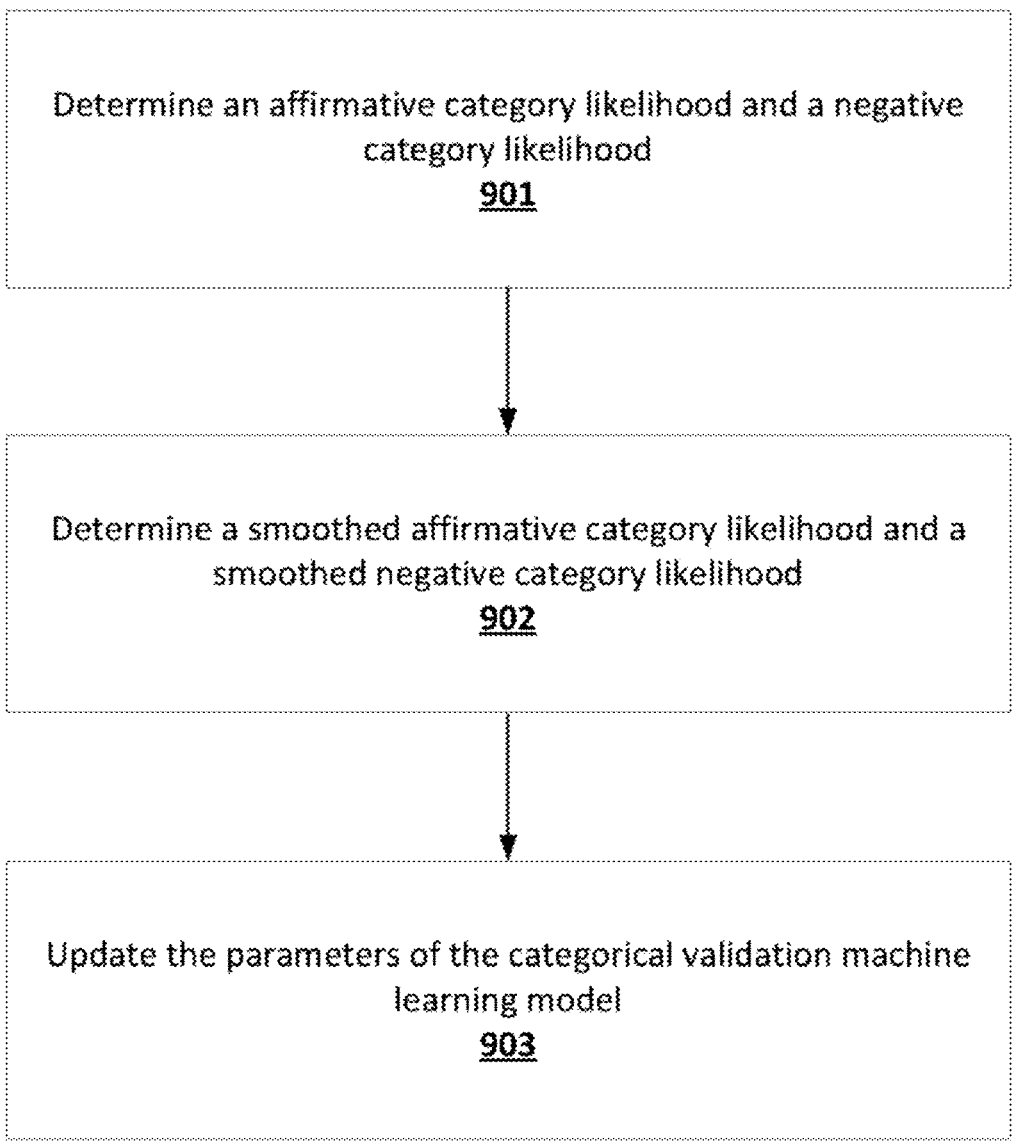

FIG. 9 is a flowchart diagram of an example process for updating parameters of a categorical validation machine learning model based at least in part on a transformed training production line image in accordance with some embodiments discussed herein.

Figure 10:
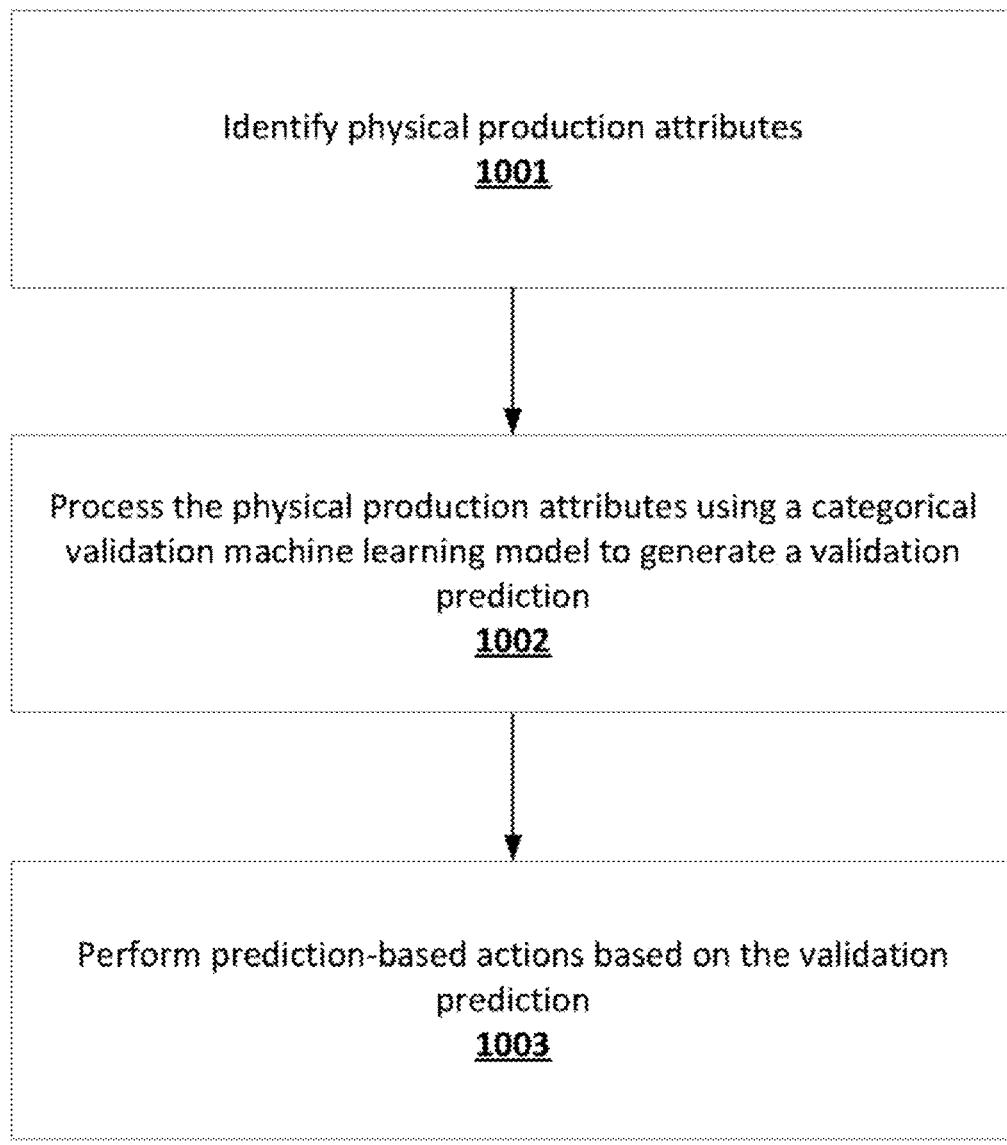

FIG. 10 is a flowchart diagram of an example process for generating a validation prediction for an input production line image with respect to a target validation category by using a trained categorical validation machine learning model based at least in part on a transformed training production line image in accordance with some embodiments discussed herein.

Figure 11:
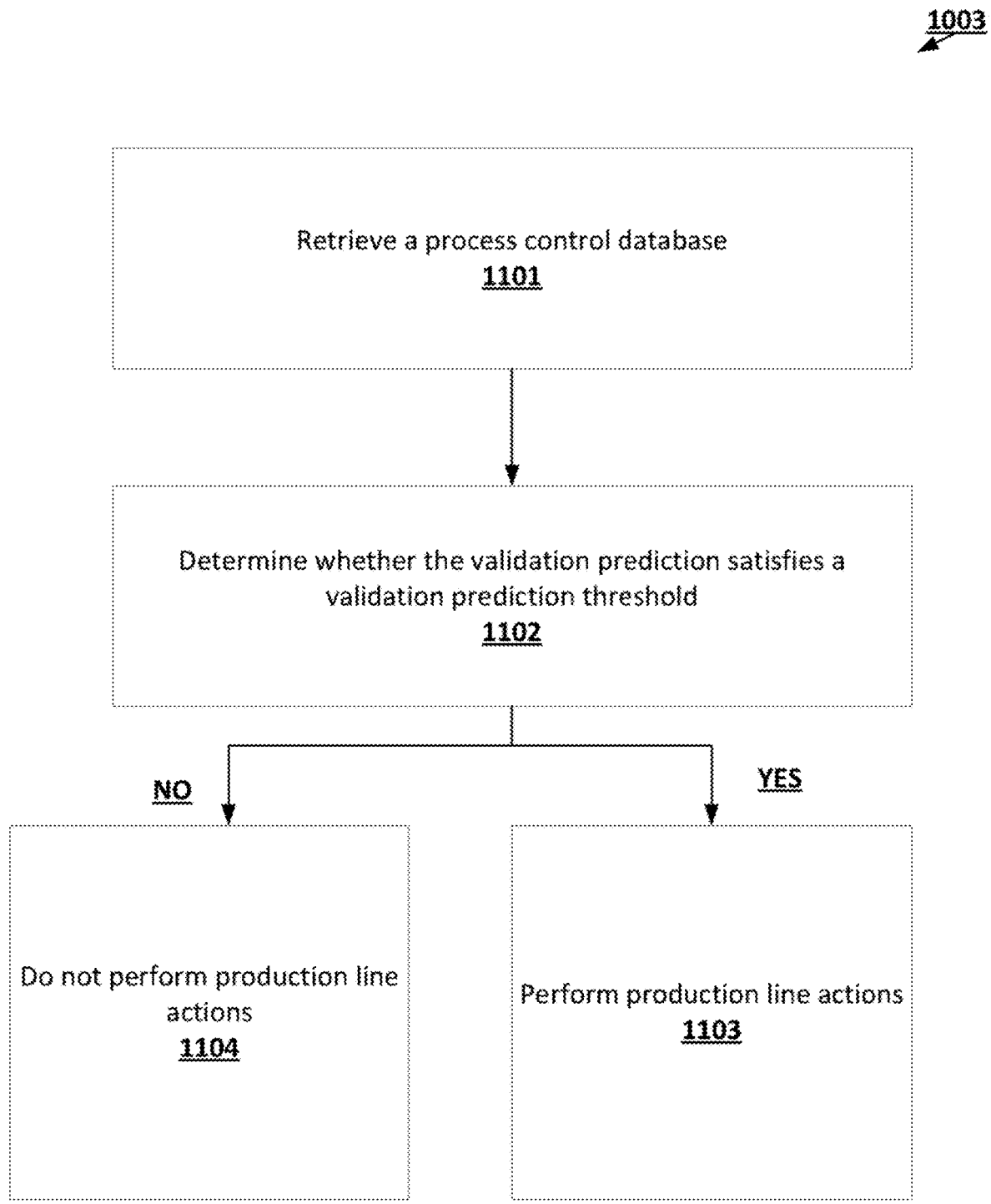

FIG. 11 is a flowchart diagram of an example process for performing one or more prediction-based actions based at least in part on a validation prediction for an input production line image with respect to a target validation category in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention provide techniques for efficiently and reliably performing conformance monitoring of a production line in order to determine defective/non-conformant production line items. For example, various embodiments of the present invention utilize systems, methods, and computer program products that perform production line conformance monitoring by utilizing categorical validation machine learning models that are generated using a plurality of training production line images associated with a related category subset of a plurality of validation categories for a target validation category. By enabling conformance monitoring of a production line, various embodiments of the present invention reduce the cost to production line control systems resulting from manual conformance monitoring and remove the need for operations needed to enable human agents to perform manual conformance monitoring. Moreover, by enabling conformance monitoring of a production line, various embodiments of the present invention reduce or remove the need for operations needed to address the presence of defective products resulting from unreliable conformance monitoring of the production line, such as operations needed to enable human agents to perform manual conformance monitoring of later-stage products that exist in a production process after the production line. By enabling the noted functionalities and associated advantages, various embodiments of the present invention reduce the operational load on production line control systems and thus improve the operational efficiency and the operational reliability of the noted production line control systems.

An exemplary application of various embodiments of the present invention relates to validating and confirming whether pills contained in a vial are the correct pills identified by a pill identifier. For example, various embodiments of the present invention train and implement binary classification convolutional neural network models to generate a signal indicating whether a ground truth identity of the pills matches a predicted identity based on a provided pill identifier. A key benefit of various embodiments of the present invention is to ensure and validate that incorrect medication is not administered and distributed. Various health risks arise when an incorrect medication is consumed; thus, various embodiments of the present invention may serve as a vital tool to prevent or reduce occurrence of such health risks. Various embodiments of the present invention may also be applied to detecting foreign bodies inadvertently contained or packaged with pills in a vial.

Various embodiments of the present invention are configured to collect and process training data in order to train models in order to distinguish pills of a target National Drug Code (NDC) from other pills. A training set of images is intentionally selected and processed before being provided to the models for training. That is, various embodiments of the present invention provide operations for selecting a training dataset, and selecting the training dataset may be based on an identification of a cohort of similar NDCs to a target NDC for which the training dataset is relevant.

A large set of potential training images may be received, and the set contains potential training images identifying different pills identified by various NDCs. The large set may first be filtered by removing blurry and high brightness images. Each potential training image is processed and associated with a blurriness value and a brightness value. The blurriness value may be determined based on a variance of the Laplacian transform of the potential training image after being processed by a Gaussian Edge Detection algorithm. The brightness value may be determined based on a root mean square of pixel values of the potential training image. Specifically, in some embodiments, potential training images with blurriness values under 6 and brightness values greater than 200 are removed from the large set to form a filtered set. Each potential training image in the filtered set is then cropped using center crop or other cropping methods. An average color for each NDC identifying pills in the filtered set of images is then determined. In some aspects, a separate set of 1,000 labelled images for each NDC is used to determine an average color; however, in other aspects, images in the filtered set may also be used to determine an average color for each NDC. Specifically, an average pixel value may be determined per channel (e.g., each channel in a RGB color space) to determine an average color for each NDC.

Using a k-dimensional tree tree algorithm based on each average color of the NDCs, a number of similar or "nearest neighbor" NDCs are identified for each NDC. In some aspects, 20 similar NDCs are identified. Thus, as a result, each NDC is associated with a number (e.g., 20) of similar NDCs. The number of similar NDCs to the target NDC is then filtered by removing NDCs that do not have the same physical characteristic as the target NDC in at least one regard. For example, NDCs with different shapes (e.g., round, oblong, capsule, teardrop) are removed to result in a cohort of similar NDCs to the target NDC. The physical characteristics, such as pill shape, may be obtained from publicly available NDC data. As a result then, only training images of pills identified by the cohort of similar NDCs to the target NDC are used to train one or more models for the target NDC. In some aspects, the number of similar NDCs in the cohort is less than or equal to 20. This process of determining a cohort of similar NDCs to obtain a training dataset may be repeated for different target NDCs. Clearly, identifying a cohort of similar NDCs is advantageous in narrowing training datasets and thereby increasing the efficacy of the models to distinguish pills of the target NDC to similar looking pills identified by the cohort of similar NDCs. Thus, this operation for collecting and processing training data by determining a cohort of similar NDCs to a target NDC may be a first inventive aspect of various embodiments of the present invention.

One or more models for distinguishing pills of a target NDC from other pills may be trained on a training set of images selected based on the cohort of similar NDCs to the target NDC. Each image in the training set may be processed using one or more image transformations before being used to train the models. Various image transformations may be performed on each image in the training set based on the target NDC. Further, various image transformations may be performed on each image in the training based on a combination of the target NDC and other data such as Physical Fill Attributes (PFAs). For example, Physical Fill Attributes may include pharmacy site location, fill line number, camera identifier, camera and flash settings, data, and/or time. Thus, for example, different image transformations may be performed to train models for pills of a target NDC in images taken by a first camera and to train models for pills of the same target NDC in images taken by a second camera. Images in the training set may be processed by performing one or more of the following image transformations. Images may be cropped. Specifically, images may be cropped to a specific size, cropped from the center of the image, cropped to remove the vial containing the pills from the image (e.g., by using a deep learning model to locate the vial in the image), cropped to a window containing a maximum number of key or important features (e.g., using Sliding Window Intelligent Crop and cropping to a window containing a maximum number of Binary Robust Invariant Scalable Keypoints (BRISK)).

As another transformation, images may be enhanced and/or normalized. Various enhancing and normalizing operations may be based on a selected color space for each image. Lightness correction may be performed for images in the LAB color space. Lightness correction involves transferring the L channel (representing lightness) from a specimen image representing a particular NDC to images in the training set of the same particular NDC. The specimen image may be an image representative of the particular NDC and selected by a human user or an AI prediction model. Histogram equalization may be performed for images in the RGB color space. Histogram equalization adjusts global contrast across image pixels to better distribute frequent intensity values, thereby enhancing over or under exposed portions of the image. Specifically, histogram equalization may calculate a cumulative distribution function for pixel values of an image, masking all pixel values to 0, and replacing the pixel values with a calculated mean pixel value for each channel (e.g., R channel, G channel, B channel in RGB color space). BRISK feature detection may be performed to identify dense areas of key points in an image (typically representative of an imprint on the surface of a pill), which can then be used to feature match between different images for image alignment.

In some embodiments, image parameters may be measured. Blurriness and brightness values may be determined for each image in the training set. As mentioned, blurriness may be based on a variance of a Laplacian transform of an image processed via Gaussian Edge Detection algorithm, and brightness may be based on the root mean square on pixel values. Images with a blurriness value below 6 may be labelled as blurry, and images with a brightness value greater than or equal to 200 may be labelled as bright. Using the transformed images in the training set, one or more individual convolutional neural network (CNN) models may be trained. In some aspects, the CNN models are configured with five total layers composed of four 2D convolution layers and one flatten layer. Filters in the four 2D convolution layers may increase in value across the four layers. Each 2D convolution layer may perform a rectifier linear unit (ReLU) action function. Each 2D convolution layer may also perform a pooling step and be configured with a dropout value. Each CNN model may be configured to perform loss and optimizer functions. In some aspects, the CNN models use binary cross-entropy as a loss function and Adam Optimizer (a stochastic gradient descent) as an optimizer function. Class weights are also calculated for each training set of images. A class weight may be determined by classifying each image into a 0 or a 1 class and using a log function to obtain a class weight.

If a training set has a low number of images (e.g., less than 1000 images), data augmentation may be done to train the one or more CNN models. An image may be cropped to remove the vial, and a sliding window may be used to obtain different views of the image. Each different view can further be translated or rotated to generate more images. To manage the one or more CNN models and other related data or information, a datastore may be loaded and maintained. In some embodiments, the datastore may be a linked multiple-table structure. Each row of the datastore may be unique to an NDC or an NDC/PFA combination. Each row may then contain (i) key values related to the NDC or PFA, (ii) references to one or more CNN models trained for and associated with the NDC or NDC/PFA combination of the row, (iii) one or more threshold values, (iv) rules for evaluating model outputs with threshold values, and (v) model specific transformations and measurement parameters. Thus, various embodiments of the present invention are directed to training of various models based on a target NDC and/or PFAs, and maintaining the models and other data in a datastore in a specific format. As such, this operation of training models on a NDC and/or NDA and PFA combination level, and maintaining the models in a datastore in a specific format is another inventive aspect of various embodiments of the present invention.

Some embodiments describe a system including the trained models and/or the datastore containing the trained models and other data that may receive an image of pills in a vial and be tasked with determining whether the pills are pills identified by a specific NDC. In such aspects, the system may implement a software Application Programming Interface (API) and receive an API call, which may include an input image of pills in a vial, a NDC representing the suspected identity of the pills in the input image, and other data such as PFAs, and subsequently generate and return an API response with an indication or signal whether the pills identified in the input image are correctly identified by received NDC. Then, a row in the datastore may be identified that corresponds to the received NDC and/or PFAs. In some aspects, if no row is identified to correspond to the received NDC and/or PFAs, the system generates an exception signal indicating that the pills identified in the input image are not correctly identified by the received NDC. Otherwise, the input image may be measured for blurriness and brightness and may also be transformed according to the model-specific transformations indicated by the row in the datastore. The transformed input image is then passed to the one or more CNN models indicated by the row in the datastore. Image measurements and the model results are compared to threshold values indicated by the row in the datastore using rules indicated by the row in the datastore. Based on the evaluation of the rules, an output signal may be generated and provided. The output signal may be configured to indicate whether the pills in the input image match the received NDC. Specifically, the output signal may comprise values representing "Exception," "Not Exception," or "Error." Based on the output signal, various actions may be performed. For example, an "Exception" output signal may cause the vial identified by the input image to be redirected to a human pharmacist or technician for manual validation. As another example, an "Exception" output signal may cause the vial identified by the input image to be refilled with new pills, and the system may reevaluate based on another input image taken of the vial with new pills. In some aspects, a separate output signal may be provided to indicate that a foreign object is detected in the input image. In some aspects, the input image may be used to retrain or further train one or more CNN models.

II. DEFINITIONS

The term "production line image" may refer to a data entity that is configured to describe an image that is captured of a production line item on a production line. An example of a production line item on a production line is a to-be-filled prescription progressing along steps on a production line in a radio frequency (RF)-controlled container called a puck, where inside the puck may be a pill bottle, and where a pharmacy production line software may, via the RF signals, control the progress of each puck. In some embodiments, if the production control equipment and software detect something is wrong (for example, the vial is significantly underweight, meaning it was not filled completely), the software would generate an exception and physically route the puck to a human for further inspection and resolution. In today's commercial pharmacy world, overhead images are taken of each vial and stored before they are capped and shipped. A typical production line image may depict an overhead shot of the vial ready to be capped and sent out. In some embodiments, if a production line image is associated with a ground-truth label identifying whether the production line image corresponds to a target validation category, the production line image is referred to herein as a "training production line image." A production line image may be associated with one or more image attributes. Examples of image attributes include a product type identifier and one or more physical production attributes. An example of a product type identifier may be a drug type identifier (e.g., a National Drug Code (NDC) identifier) for a puck container. A physical production attribute may describe any property associated with production of the production line item associated with a production line image. Examples of physical production attributes include a pharmacy site location identifier associated with a pharmacy site of a puck container, a fill line number associated with a fill line of a puck container, a camera identifier for a camera device used to capture a production line image of a puck container, attributes describing one or more camera/flash settings for a camera device used to capture a production line image of a puck container, attributes describing date and/or time of capture of a production line image of a puck container, and/or the like.

The term "validation category" may refer to a data entity that is configured to describe a category defined by a subset of image attributes, where validation predictions are generated with respect to the validation category. For example, in an exemplary embodiment, validation predictions may be generated with respect to a particular drug type identifier, where the validation predictions may describe whether corresponding production line images depict production line items (e.g., puck containers) associated with the drug type identifier. As another example, in another exemplary embodiment, validation predictions may be generated with respect to a particular drug type identifier and a particular pharmacy site location identifier, where the validation predictions may describe whether corresponding production line images depict production line items (e.g., puck containers) associated with the drug type identifier that are generated at the particular pharmacy site location identifier. As yet another example, in yet another exemplary embodiment, validation predictions may be generated with respect to a particular drug type identifier, a particular pharmacy site location identifier, and a particular fill line number, where the validation predictions may describe whether corresponding production line images depict production line items (e.g., puck containers) associated with the drug type identifier that are generated at the particular fill line number of the particular pharmacy site location identifier. In general, any combination of one or more defined image attributes can be used to characterize a validation category.

The term "color channel statistical distribution vector" may refer to a data entity that is configured to describe, for each color channel of a set of color channels, a measure of statistical distribution (e.g., an average or other centroid measure) of color values associated with the color channel in pixels of a set of labeled production line images for a corresponding validation category. For example, given a validation category that is associated with a particular NDC identifier, and further given a Red-Green-Blue (RGB) color channel scheme, the color channel statistical distribution vector may describe: (i) an average pixel value for the red channel across labeled production line images that are assigned the particular NDC identifier, (ii) an average pixel value for the green channel across labeled production line images that are assigned the particular NDC identifier, and (iii) an average pixel value for the blue channel across labeled production line images that are assigned the particular NDC identifier. While various embodiments of the present invention describe using the color channels of the RGB color channel scheme, a person of ordinary skill in the relevant technology will recognize that other color channel schemes (e.g., Blue-Green-Red (BGR), Hue-Saturation-Lightness (HSL), Hue-Saturation-Value (HSV), the CIELAB color space (LAB), Red-Green-Blue-Alpha (RGBA), and/or the like) may be utilized. In some embodiments, the color channel statistical distribution vector for a validation category may describe statistical distribution measures of labeled production line images for the validation category across color channels defined by two or more color channel schemes.

The term "neighboring category subset" may refer to a data entity that is configured to describe a subset of a set of defined validation categories that are deemed similar to a target validation category based at least in part on comparing color channel statistical distribution vectors for the defined validation categories (where the set of defined validation categories includes the target validation category). For example, a neighboring category subset for a target validation category may describe an n-sized subset of a set of defined validation categories whose color channel statistical distribution vectors have the highest measures of similarity to the color channel statistical distribution vector of the target validation category (where n may for example be 20). In some embodiments, the measures of similarities of pairs of color channel statistical distribution vectors are determined using k-dimensional tree algorithms.

The term "related category subset" may refer to a data entity that is configured to describe a subset of the neighboring category subset for a target validation category, where the selected includes defined validation categories whose production line items are associated with respective shape feature descriptions that are determined to match a shape feature description of a production line item of the target validation category. In some embodiments, each defined validation category of the neighboring category subset is also in the related category subset if a shape descriptor data object of the defined validation category matches the shape descriptor object of the target validation category. A shape descriptor object may describe one or more shape-defining features of a product type identifier associated with a corresponding validation category, such as a shape-defining feature that describes whether pills associated with a pill category are round, oblong, capsule, teardrops, and/or the like. In some embodiments, shape data for NDCs are extracted from the Medispan database, which may be accessible at https://www.wolterskluwer.com/en/solutions/medi-span/medi-span/drug-data.

The term "image transformation operation" may refer to a data entity that is configured to describe a set of operations that are configured to be applied to production line images supplied to a categorical validation machine learning model for a validation category before processing the production line images to the categorical validation machine learning model. In some embodiments, the image transformation operations for a particular validation category and on a production line image include at least one of the following crop operations: (i) a set of size-based crop operations that are configured to crop a production line image to a specific size (e.g., 224×224 pixels) starting a in a predefined location (e.g., the top-left corner of the image) to generate a cropped image; (ii) a set of center crop operations to crop the production line image to a specific size (e.g., 224×224 pixels in the center of the first image while maintaining the original aspect ratio) to generate a cropped image; (iii) a set of vial removal crop operations on the production line image to generate a cropped image; and (iv) a set of sliding window intelligent crop operations (e.g., by using a sliding window object detection algorithm starting with a window size of 224×224 and a step size of five to detect and count the number of Binary Robust Invariant Scalable Keypoints (BRISKs) found in each of the sliding windows and selecting the sliding window containing the maximum number of BRISKs) on the production line image to generate a cropped image. The image transformation operations then continue with selecting a color channel scheme (e.g., where different color channel schemes may be used for different preprocessing techniques of different validation categories) and adjusting global contrast across image pixels of the cropped image to generate a second image (e.g., in order to help better distribute frequent intensity values and enhance over- or under-exposed sections of the fourth image). The image transformation operations then continue with masking all pixels of the second image to zero and replacing each pixel with the calculated mean of pixels in any given color channel across the second image to generate a third image. The image transformation operations then continue with, if the selected color channel scheme is the LAB color channel scheme, transferring the L channel (representing lightness) of a specimen image (e.g., a specimen image selected by a human expert) for the target validation category associated with the training production line image to the third image in order to generate a fourth image.

The term "vial removal crop operations" may refer to a data entity that is configured to describe a set of operations that are configured to crop an input image in a manner that is configured to remove an estimated vial area depicted in the input image. In some embodiments, the vial removal crop operations center crop an image to a defined size (e.g., 350×350 pixels) in the center of an image to remove some of the potential pills by cropping a box instead of a circle. In some embodiments, the vial removal crop operations use a training deep learning model to intelligently locate the vial in an input image.

The term "sliding window intelligent crop operations" may refer to a data entity that is configured to describe a set of operations that are configured to determine an output image based at least in part on a recursively-generated sliding window of an input image. In some embodiments, the sliding window intelligent crop operations may be configured to: (i) generate a set of sliding windows by using an image pyramid and a sliding window object detection algorithm starting with a window size of 224×224 and a step size of 5, (ii) for each sliding window, detect the number of BRISKs found in the sliding window, and (iii) select as the output image the sliding window with the highest number of detected BRISKs in the sliding window.

The term "lightness correction operations" may refer to a data entity that is configured to describe a set of operations that are configured to replace an L channel of each input image with the L channel of a specimen image for a target validation category (e.g., a specimen image for a product type identifier of the target validation category, such as a specimen image for an NDC as selected by a human expert) to generate an output image. Aspects of performing the lightness correction operations are described in Reinhard et al., *Color Transfer Between Images*, IEEE Computer Graphics and Applications (2001), available online at https://ieeexplore.ieee.org/abstract/document/946629.

The term "categorical validation machine learning model" may refer to a data entity that is configured to describe parameters, hyper-parameters, and/or defined operations of a machine learning model that is configured to determine whether an input production line image corresponds to a target validation category that is associated with the categorical validation machine learning model. In some embodiments, the categorical validation machine learning model is configured to process at least one of the production line image (e.g., as a matrix), extracted image-based features values associated with the input production line image (e.g., as a vector), and one or more physical production attributes for the input production line image (as a vector), in order to determine a validation prediction for the input production line image that describes whether an input production line image corresponds to a target validation category that is associated with the categorical validation machine learning model. In some embodiments, the categorical validation machine learning model comprises a convolutional neural network, such as a binary classification convolutional neural network that is characterized by at least one of the following: five total layers comprised of four two-dimensional convolutional layers and one flattening layer, where filters are increased across two-dimensional convolutional layers to capture patterns and details in the input production line image, and where each 2-dimensional convolutional layer utilizes a rectified linear unit (ReLU) activation function. In some embodiments, each two-dimensional convolution operation in a two-dimensional convolutional layer is followed by a pooling operation (e.g., with a size and stride of two), where dropout values are increased across two dimensional convolutional layers to a maximum value (e.g., a maximum value of 0.7). In some embodiments, the categorical validation machine learning model is trained using a binary cross-entropy loss function, with constant label smoothing (e.g., constant label smoothing at 0.1 to train the model with mislabeled data and with improved overall robustness and accuracy). In some embodiments, to train the categorical validation machine learning model, an optimization function such as Adam Optimizer function or a Stochastic gradient descent optimizer function is utilized. While various embodiments of the present invention describe that the categorical validation machine learning model comprises a convolutional neural network, a person of ordinary skill in the relevant technology will recognize that any machine learning model (e.g., any neural network, such as any pre-trained neural network) may be utilized as part of the categorical validation machine learning model.

The term "extracted image-based feature" may refer to a data entity that is configured to describe an extracted feature of a production line image that is extracted from the image data of the production line image. Examples of extracted image-based features include key point descriptors for the production line image, such as key point descriptors generated by decomposing the production line image to key points that represent a unique feature (e.g., using BRISK feature detection techniques that decompose the production line image to key points that represent a unique feature defined in a 128-vector descriptor). Exemplary techniques for generating key point descriptors for production line images are described in Zheng et al., *An Algorithm for Accuracy Enhancement of License Plate Recognition*, Journal of Computer and System Sciences (2013), available online at https://www.sciencedirect.com/science/article/pii/S0022000012001018.

The term "physical production attribute" may refer to a data entity that is configured to describe a property associated with production of the production line associated with a production line image. Examples of physical production attributes include a pharmacy site location identifier associated with a pharmacy site of a puck container, a fill line number associated with a fill line of a puck container, a camera identifier for a camera device used to capture a production line image of a puck container, attributes describing one or more camera/flash settings for a camera device used to capture a production line image of a puck container, attributes describing date and/or time of capture of a production line image of a puck container, and/or the like.

The term "validation prediction" may refer to a data entity that is configured to describe a conclusion about whether a corresponding production line image that is associated with the validation prediction is associated with a corresponding validation category. For example, the validation prediction may describe a likelihood that a corresponding production line image that is associated with the validation prediction describes a production line item for a validation category that is associated with the validation prediction, a likelihood that a corresponding production line image that is associated with the validation prediction does not describe a production line item for a validation category that is associated with the validation prediction, and/or the like. In some embodiments, a validation prediction describes at least one of an affirmative category likelihood for the production line image and a negative category likelihood for the production line image. In some embodiments, a validation prediction describes at least one of a smoothed affirmative likelihood for the production line image and a smoothed negative category likelihood for the production line image. The affirmative category likelihood for the training production line image may describe a value generated by the categorical validation machine learning model that describes a likelihood that a production line image provided as an input to the categorical validation machine learning model (e.g., during training, a training production line image) corresponds to a validation category associated with the categorical validation machine learning model. The negative category likelihood for the training production line image may describe a value generated by the categorical validation machine learning model that describes a likelihood that a production line image provided as an input to the categorical validation machine learning model (e.g., during training, a training production line image) does not correspond to a validation category associated with the categorical validation machine learning model. In some embodiments, the affirmative category likelihood and the negative category likelihood are processed using a likelihood smoothing transformation to determine a smoothed affirmative likelihood and a smoothed negative category likelihood. In some embodiments, determining the validation prediction comprises: determining an initial validation score based at least in part on one or more outputs of the categorical validation machine learning model; determining an adjusted validation score based at least in part on adjusting the initial validation score using a false positive penalty weight and a false negative penalty weight; and determining the validation prediction based at least in part on the adjusted validation score.

The term "process control database" may refer to a set of one or more data entities (e.g., a set of data entities stored in a distributed manner) that contain data for a database that describes, for each validation category of a set of defined validation categories, the validation prediction threshold for the validation category and the one or more process control parameters for the validation category, where the validation prediction threshold for the validation category may describe a condition that, when satisfied by the validation prediction for a production image line image with respect to the validation category, causes performance of one or more production line control actions based at least in part on one or more process control parameters associated with the validation category. For example, the validation prediction threshold may recommend that, when a validation prediction for a production lime image with respect to a corresponding validation category exceeds a particular numeric value, the one or more production line control actions for the corresponding validation category should be performed. As another example, the validation prediction threshold may recommend that, when a validation prediction for a production lime image with respect to a corresponding validation category falls below a particular numeric value, the one or more production line control actions for the corresponding validation category should be performed. An exemplary process control action may be triggering an exception that causes a production line item associated with a production line image to be diverted to a human inspector. Another exemplary process control action may be triggering an exception that causes a production line item associated with a production line image to be diverted to a human inspector and a user interface depicting the production line image to be presented to the human inspector. A yet another process control action may be triggering an exception that causes a production line item associated with a production line image to be diverted to a human inspector, and a user interface depicting the production line image as well as the physical production attributes of the production line image to be presented to the human inspector. In some embodiments, the process control database may describe, for each validation category of a set of defined validation categories, specific image transformation requirements and measurement parameters associated with the validation category, such as properties associated with the crop, enhancement, and measurement transformations for the validation category. In some embodiments, the process control database may describe data associated with each validation category in a row of a relational database, where the row is associated with the validation category. In some embodiments, the process control database may describe data associated with each validation category in a column of a relational database, where the column is associated with the validation category.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from monitoring agent computing entities 102, process the predictive data analysis requests to generate predictions, provide the generated predictions to the monitoring agent computing entities 102, and automatically perform prediction-based actions based at least in part on the generated predictions and by interacting with the production line control system 110. An example of a prediction-based action that can be performed using the predictive data analysis system 101 is a request for performing a production line control task, such as a drug production control task.

In some embodiments, predictive data analysis system 101 may communicate with at least one of the monitoring agent computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more monitoring agent computing entities 102, process the predictive data analysis requests to generate predictions corresponding to the predictive data analysis requests, provide the generated predictions to the monitoring agent computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Monitoring Agent Computing Entity

FIG. 3 provides an illustrative schematic representative of an monitoring agent computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Monitoring agent computing entities 102 can be operated by various parties. As shown in FIG. 3, the monitoring agent computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the monitoring agent computing entity 102 may be capable of operating with one or more air interface standards, communication protocols, modulation types, and access types. More particularly, the monitoring agent computing entity 102 may operate in accordance with any of a number of wireless communication standards and protocols, such as those described above with regard to the predictive data analysis computing entity 106. In a particular embodiment, the monitoring agent computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the monitoring agent computing entity 102 may operate in accordance with multiple wired communication standards and protocols, such as those described above with regard to the predictive data analysis computing entity 106 via a network interface 320.

Via these communication standards and protocols, the monitoring agent computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The monitoring agent computing entity 102 can also download changes, add-ons, and updates, for instance, to its firmware, software (e.g., including executable instructions, applications, program modules), and operating system.

According to one embodiment, the monitoring agent computing entity 102 may include location determining aspects, devices, modules, functionalities, and/or similar words used herein interchangeably. For example, the monitoring agent computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the monitoring agent computing entity's 102 position in connection with a variety of other systems, including cellular towers, Wi-Fi access points, and/or the like. Similarly, the monitoring agent computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The monitoring agent computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the monitoring agent computing entity 102 to interact with and/or cause display of information/data from the predictive data analysis computing entity 106, as described herein. The user input interface can comprise any of a number of devices or interfaces allowing the monitoring agent computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the monitoring agent computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The monitoring agent computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the monitoring agent computing entity 102. As indicated, this may include a user application that is resident on the entity or accessible through a browser or other user interface for communicating with the predictive data analysis computing entity 106 and/or various other computing entities.

In another embodiment, the monitoring agent computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the monitoring agent computing entity 102 may be embodied as an artificial intelligence (AI) computing entity, such as an Amazon Echo, Amazon Echo Dot, Amazon Show, Google Home, and/or the like. Accordingly, the monitoring agent computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Provided below are exemplary techniques for generating a categorical validation machine learning model and for using a trained categorical validation machine learning model to generate validated predictions. However, a person of ordinary skill in the relevant technology will recognize that: (i) the techniques described herein for using a trained categorical validation machine learning model to generate validation prediction can be performed by using a trained categorical validation machine learning model that is generated using techniques other than the model training techniques described herein, and (ii) the techniques described herein for generating a categorical validation machine learning model can be used to generate categorical validation machine learning models that can be used as part of model inference routines that diverge from the model inference techniques described herein.

Various embodiments of the present invention provide techniques for efficiently and reliably performing conformance monitoring of a production line in order to determine defective/non-conformant production line items. For example, various embodiments of the present invention utilize systems, methods, and computer program products that perform production line conformance monitoring by utilizing categorical validation machine learning models that are generated using a plurality of training production line images associated with a related category subset of a plurality of validation categories for a target validation category. By enabling conformance monitoring of a production line, various embodiments of the present invention reduce the cost to production line control systems resulting from manual conformance monitoring and remove the need for operations needed to enable human agents to perform manual conformance monitoring. Moreover, by enabling conformance monitoring of a production line, various embodiments of the present invention reduce or remove the need for operations needed to address the presence of defective products resulting from unreliable conformance monitoring of the production line, such as operations needed to enable human agents to perform manual conformance monitoring of later-stage products that exist in a production process after the production line. By enabling the noted functionalities and associated advantages, various embodiments of the present invention reduce the operational load on production line control systems and thus improve the operational efficiency and the operational reliability of the noted production line control systems.

Model Training Operations

FIG. 4 is a flowchart diagram of an example process 400 for generating a categorical validation machine learning model for a target validation category. While various embodiments of the present invention describe generating a categorical validation machine learning model as being performed by the same computing entity as the computing entity used to generate validation predictions by a categorical validation machine learning model, a person of ordinary skill in the relevant technology will recognize that in some embodiments a first set of one or more computing entities may generate a categorical validation machine learning model and a second set of one or more computing entities may generate the validation prediction by utilizing the categorical validation machine learning model.

The process 400 begins at step/operation 401 when the predictive data analysis computing entity 106 determines a plurality of training production line images for the target validation category. In some embodiments, the predictive data analysis computing entity 106 determines the plurality of training production line images for the target validation category based at least in part on a related category subset for the target validation category, as further described below.

In general, a production line image may refer to an image that is captured of a production line item on a production line. An example of a production line item on a production line is a to-be-filled prescription progressing along steps on a production line in a radio frequency (RF)-controlled container called a puck (as for example depicted in FIG. 6), where inside the puck may be a pill bottle, and where a pharmacy production line software may, via the RF signals, control the progress of each puck. In some embodiments, if the production control equipment and software detect something is wrong (for example, the vial is significantly under-weight, meaning it was not filled completely), the software would generate an exception and physically route the puck to a human for further inspection and resolution. In today's commercial pharmacy world, overhead images are taken of each vial and stored before they are capped and shipped. A typical production line image may depict an overhead shot of the vial ready to be capped and sent out. In some embodiments, if a production line image is associated with a ground-truth label identifying whether the production line image corresponds to a target validation category, the production line image is referred to herein as a "training production line image."

A production line image may be associated with one or more image attributes. Examples of image attributes include a product type identifier and one or more physical production attributes. An example of a product type identifier may be a drug type identifier (e.g., a National Drug Code (NDC) identifier) for a puck container. A physical production attribute may describe any property associated with production of the production line item associated with a production line image. Examples of physical production attributes include a pharmacy site location identifier associated with a pharmacy site of a puck container, a fill line number associated with a fill line of a puck container, a camera identifier for a camera device used to capture a production line image of a puck container, attributes describing one or more camera/flash settings for a camera device used to capture a production line image of a puck container, attributes describing date and/or time of capture of a production line image of a puck container, and/or the like.

An operational example of a production line image 700 is depicted in FIG. 7. As depicted in FIG. 7, the production line image 700 is an overhead shot of a vial ready to be capped and sent out. The white dashes near the outside of the photo are from external lighting. The vial itself is a circular feature with amber-orange color near the outside of the image. The production line image 700 also depicts pills outside the depicted container.

A validation category may be a category defined by a subset of image attributes, where validation predictions are generated with respect to the validation category. For example, in an exemplary embodiment, validation predictions may be generated with respect to a particular drug type identifier, where the validation predictions may describe whether corresponding production line images depict production line items (e.g., puck containers) associated with the drug type identifier. As another example, in another exemplary embodiment, validation predictions may be generated with respect to a particular drug type identifier and a particular pharmacy site location identifier, where the validation predictions may describe whether corresponding production line images depict production line items (e.g., puck containers) associated with the drug type identifier that are generated at the particular pharmacy site location identifier. As yet another example, in yet another exemplary embodiment, validation predictions may be generated with respect to a particular drug type identifier, a particular pharmacy site location identifier, and a particular fill line number, where the validation predictions may describe whether corresponding production line images depict production line items (e.g., puck containers) associated with the drug type identifier that are generated at the particular fill line number of the particular pharmacy site location identifier. In general, any combination of one or more defined image attributes can be used to characterize a validation category.

In some embodiments, step/operation 401 may be performed in accordance with the process that is depicted in FIG. 5. The process that is depicted in FIG. 5 begins at step/operation 501 when the predictive data analysis computing entity 106 removes blurry and high brightness images from a training image dataset. In some embodiments, determining whether an image is blurry is performed by using a Laplacian of Gaussian Edge Detection algorithm (e.g., by removing images with a variance below six). In some embodiments, determining whether an image is high brightness is performed by using a root mean square (RMS) technique and by removing brightness values that are above a brightness threshold (e.g., a brightness threshold of 200). In some embodiments, removing blurry and high brightness images increases the quality of available training data and provides the opportunity to correct photography issues in production lines.

At step/operation 502, the predictive data analysis computing entity 106 performs one or more crop operations on each training production line image in the training image dataset to generate a first set of training production line images. Examples of crop operations include center crop operations (e.g., cropping a training production line image to 224×224 pixels in the center of image while maintaining the original aspect ratio), operations configured to crop the training production line image to a specific size (e.g., to a size of 224×224 starting in a predefined location like the top left corner), sliding window intelligent crop operations (e.g., by using an image pyramid and a sliding window object detection algorithm starting with a window size of 224×224 and a step size of five to detect and count the number of Binary Robust Invariant Scalable Keypoints (BRISKs) found in each of the sliding windows and selecting the sliding window containing the maximum number of BRISKs), and/or the like.

At step/operation 503, the predictive data analysis computing entity 106 determines, for each validation category, a color channel statistical distribution vector based at least in part on the one or more labeled production line images for the target validation category. In some embodiments, the predictive data analysis computing entity 106 first identifies a set of (e.g., a defined number of, such as 1000) training images in the first set of training production line images that are assigned a label associated with the target validation category as the set of labeled production line images for the target validation category, and subsequently determines the color channel statistical distribution vector for the target validation category based at least in part on the set of labeled production line images for the target validation category.

A color channel statistical distribution vector may describe, for each color channel of a set of color channels, a measure of statistical distribution (e.g., an average or other centroid measure) of color values associated with the color channel in pixels of a set of labeled production line images for a corresponding validation category. For example, given a validation category that is associated with a particular NDC identifier, and further given a Red-Green-Blue (RGB) color channel scheme, the color channel statistical distribution vector may describe: (i) an average pixel value for the red channel across labeled production line images that are assigned the particular NDC identifier, (ii) an average pixel value for the green channel across labeled production line images that are assigned the particular NDC identifier, and (iii) an average pixel value for the blue channel across labeled production line images that are assigned the particular NDC identifier. While various embodiments of the present invention describe using the color channels of the RGB color channel scheme, a person of ordinary skill in the relevant technology will recognize that other color channel schemes (e.g., Blue-Green-Red (BGR), Hue-Saturation-Lightness (HSL), Hue-Saturation-Value (HSV), the CIELAB color space (LAB), Red-Green-Blue-Alpha (RGBA), and/or the like) may be utilized. In some embodiments, the color channel statistical distribution vector for a validation category may describe statistical distribution measures of labeled production line images for the validation category across color channels defined by two or more color channel schemes.

At step/operation 504, the predictive data analysis computing entity 106 determines a neighboring category subset of a plurality of defined validation categories for the target validation category based at least in part on each color channel statistical distribution vector for a defined validation category. In some embodiments, a neighboring category subset for a target validation category describes a subset of a set of defined validation categories that are deemed similar to a target validation category based at least in part on comparing color channel statistical distribution vectors for the defined validation categories (where the set of defined validation categories includes the target validation category). For example, a neighboring category subset for a target validation category may describe an n-sized subset of a set of defined validation categories whose color channel statistical distribution vectors have the highest measures of similarity to the color channel statistical distribution vector of the target validation category (where n may for example be 20). In some embodiments, the measures of similarities of pairs of color channel statistical distribution vectors are determined using one or more k-dimensional tree algorithms.

At step/operation 505, the predictive data analysis computing entity 106 determines a related category subset of the neighboring category subset. In some embodiments, each defined validation category of the neighboring category subset is also in the related category subset if a shape descriptor data object of the defined validation category matches the shape descriptor object of the target validation category. A shape descriptor object may describe one or more shape-defining features of a product type identifier associated with a corresponding validation category, such as a shape-defining feature that describes whether pills associated with a pill category are round, oblong, capsule, teardrops, and/or the like. In some embodiments, shape data for NDCs are extracted from the Medispan database, which may be accessible at https://www.wolterskluwer.com/en/solutions/medi-span/medi-span/drug-data.

At step/operation 506, the predictive data analysis computing entity 106 combines the labeled production line images for each defined validation category in the related category subset (which also includes the labeled production line images for the target validation category itself that is in the related category subset) to generate the plurality of training production line images for the target validation category. In some embodiments, restricting the training set in this manner increases the efficacy of the categorical validation machine learning models to distinguish similar looking pills without increasing the training and runtime costs associated with the categorical validation machine learning models.

Returning to FIG. 4, at step/operation 402, the predictive data analysis computing entity 106 generates a plurality of transformed training production line images for the target validation category based at least in part on the plurality of training production line images for the target validation category. In some embodiments, one or more image transformation operations are applied on the plurality of transformed training production line images to generate the plurality of transformed training production line images. Examples of image transformation operations include crop operations and enhancement/normalization operations.

For example, in some embodiments, generating plurality of transformed training production line images comprises performing one or more center crop operations on the plurality of training production line images to generate a first plurality of cropped training production line images; performing one or more sliding window intelligent crop operations on the first plurality of cropped training production line images to generate a second plurality of cropped training production line images; performing one or more lightness correction operations on the second plurality of cropped training production line images to generate a plurality of lightness-corrected training production line images; and generating the plurality of transformed training production line images based at least in part on the plurality of lightness-corrected training production line images.

In some embodiments, the image transformation operations for a particular validation category and on a production line image include at least one of the following crop operations: (i) a set of size-based crop operations that are configured to crop a production line image to a specific size (e.g., 224×224 pixels) starting a in a predefined location (e.g., the top-left corner of the image) to generate a cropped image; (ii) a set of center crop operations to crop the production line image to a specific size (e.g., 224×224 pixels in the center of the first image while maintaining the original aspect ratio) to generate a cropped image; (iii) a set of vial removal crop operations on the production line image to generate a cropped image; and (iv) a set of sliding window intelligent crop operations (e.g., by using a sliding window object detection algorithm starting with a window size of 224×224 and a step size of five to detect and count the number of Binary Robust Invariant Scalable Keypoints (BRISKs) found in each of the sliding windows and selecting the sliding window containing the maximum number of BRISKs) on the production line image to generate a cropped image. The image transformation operations then continue with selecting a color channel scheme (e.g., where different color channel schemes may be used for different preprocessing techniques of different validation categories) and adjusting global contrast across image pixels of the cropped image to generate a second image (e.g., in order to help better distribute frequent intensity values and enhance over- or under-exposed sections of the fourth image). The image transformation operations then continue with masking all pixels of the second image to zero and replacing each pixel with the calculated mean of pixels in any given color channel across the second image to generate a third image. The image transformation operations then continue with, if the selected color channel scheme is the LAB color channel scheme, transferring the L channel (representing lightness) of a specimen image (e.g., a specimen image selected by a human expert) for the target validation category associated with the training production line image to the third image in order to generate a fourth image. In some embodiments, different cropping techniques are used for different validation categories, based at least in part on observations about how particular cropping operations provide accurate results in relation to capturing more significant portions of production line images for particular validation categories. For example, a particular cropping technique (e.g., sliding window intelligent cropping) may be used for production line images having a particular National Drug Code (NDC). As described above, in some embodiments, the image transformation operations include vial removal crop operations. The vial removal crop operations may be configured to crop an input image in a manner that is configured to remove an estimated vial area depicted in the input image. In some embodiments, the vial removal crop operations center crop an image to a defined size (e.g., 350×350 pixels) in the center of an image to remove some of the potential pills by cropping a box instead of a circle. In some embodiments, the vial removal crop operations use a training deep learning model to intelligently locate the vial in an input image.

As further described above, in some embodiments, the image transformation operations include sliding window intelligent crop operations. The sliding window intelligent crop operations may be configured to determine an output image based at least in part on a recursively-generated sliding window of an input image. In some embodiments, the sliding window intelligent crop operations may be configured to: (i) generate a set of sliding windows by using an image pyramid and a sliding window object detection algorithm starting with a window size of 224×224 and a step size of 5, (ii) for each sliding window, detect the number of BRISKs found in the sliding window, and (iii) select as the output image the sliding window with the highest number of detected BRISKs in the sliding window.

As further described above, in some embodiments, the image transformation operations include selecting a color channel scheme. In some embodiments, the LAB color channel scheme is selected. Aspects of the LAB color channel scheme are described in Murali et al., *Shadow Detection and Removal from a Single Image Using LAB Color Space*, Cybernetics and Information Technologies (2019), available online at https://www.researchgate.net/publication/274563892_Shadow_Detection_and_Removal_from_a_Single_Image_Using_LAB_Color_Space.

As further describe above, in some embodiments, the image transformation operations include adjusting global contrast over pixel images and replacing calculated mean of pixels in any given channel across an input image. The noted operations are examples of histogram equalizer operations. Aspects of the histogram equalizer operations are described in greater detail in Pisano et al., *Contrast Limited Adaptive Histogram Equalization Image Processing to Improve the Detection of Simulated Spiculations in Dense Mammo-*

*grams*, Journal of Digital Imaging (1998), available online at https://link.springer.com/article/10.1007/BF03178082.

As further described above, in some embodiments, the image transformation operations lightness correction operations, where the lightness correction operations may be configured to replace an L channel of each input image with the L channel of a specimen image for a target validation category (e.g., a specimen image for a product type identifier of the target validation category, such as a specimen image for an NDC as selected by a human expert) to generate an output image. In some embodiments, more than one L channel is transferred from the specimen image to corresponding production line images associated with the corresponding target validation category. Aspects of performing the lightness correction operations are described in Reinhard et al., *Color Transfer Between Images*, IEEE Computer Graphics and Applications (2001), available online at https://ieeexplore.ieee.org/abstract/document/946629.

At step/operation 403, the predictive data analysis computing entity 106 performs one or more data augmentation operations on the transformed training production line images to update the transformed training production line images. In some embodiments, the data augmentation operations are configured to ensure that a subset of the transformed training production line images that includes the transformed images for the labeled production line images of a target validation category (i.e., those production line images that are deemed to depict production line items associated with the target validation category) satisfies a labeled image count threshold, e.g., is equal to or above a labeled image count threshold of 1000.

In some embodiments, step/operation 403 is performed in accordance with the process that is depicted in FIG. 8. The process that is depicted in FIG. 8 begins at step/operation 801 when the predictive data analysis computing entity 106 identifies a set of transformed labeled production line images for the target validation category from the set of transformed training production line images. The set of transformed labeled production line images may include all of the transformed training production line images that are generated by applying image transformation operations on the labeled production line images for the target validation category. As described above, a labeled production line image for a validation category may be a production line image that is deemed to depict a production line item associated with the validation category.

At step/operation 802, the predictive data analysis computing entity 106 determines whether an initial labeled image count of the one or more transformed labeled training production line images satisfies (e.g., exceeds) a labeled image count threshold. The initial labeled image count may be the count of the one or more transformed labeled training production line images for the target validation category. An example of a labeled image count threshold is 1000.

At step/operation 803, in response to determining that the initial labeled image count satisfies the labeled image count threshold, the predictive data analysis computing entity 106 adopts the transformed training production line images without generating any new images. In some embodiments, because the initial labeled image count satisfies the labeled image count threshold, the predictive data analysis computing entity 106 is configured to skip generating new images as sufficient labeled images are deemed to exist among the transformed training production line images.

At step/operation 804, in response to determining that the initial labeled image count fails to satisfy the labeled image count threshold, the predictive data analysis computing entity 106 first performs one or more sliding window operations across each transformed labeled training production line image to generate a plurality of augmented labeled production line images. In some embodiments, the sliding window operations are defined by a sliding window of a specific size, such as a sliding window of 224×224 pixels. The augmented labeled production line images may either include both the transformed labeled production line images and the newly-generated images generated using the sliding window operations, or may just include the latter.

At step/operation 805, in response to determining that the initial labeled image count fails to satisfy the labeled image count threshold, subsequent to step/operation 804, the predictive data analysis computing entity 106 determines whether an augmented labeled image count of the plurality of augmented labeled production line images satisfies the labeled image count threshold. The augmented labeled image count may describe the count of the augmented labeled production line images. An example of a labeled image count threshold is 1000.

At step/operation 806, in response to determining that the initial labeled image count fails to satisfy the labeled image count threshold but the augmented labeled image count satisfies the labeled image count threshold, the predictive data analysis computing entity 106 adopts the augmented labeled production line images as the transformed training production line images. In some embodiments, because sliding window operations generated sufficient new images, the new images (either individually or along with the initial transformed training production line images) are adopted as the transformed training production line images used for training the categorical validation machine learning model.

At step/operation 807, in response to determining that the initial labeled image count fails to satisfy the labeled image count threshold and that the augmented labeled image count also fails to satisfy the labeled image count threshold, the predictive data analysis computing entity 106 performs one or more translation/rotation operations on the plurality of augmented labeled production line images to generate one or more translated/rotated labeled production line images until a combined count of the plurality of augmented labeled production line images and the one or more translated/rotated labeled production line images satisfies the labeled image count threshold. In some embodiments, as many iterations of an image translation/rotation routine are performed until a first iteration in which the combined count described above satisfies the labeled image count threshold. An example of a labeled image count threshold is 1000.

At step/operation 808, in response to determining that the initial labeled image count fails to satisfy the labeled image count threshold and the augmented labeled image count also fails to satisfy the labeled image count threshold, subsequent to step/operation 807, the predictive data analysis computing entity 106 generates the plurality of transformed training production line images based at least in part on the plurality of augmented labeled production line images and the one or more translated/rotated labeled production line images. In some embodiments, the predictive data analysis computing entity 106 combines the plurality of augmented labeled production line images and the one or more translated/rotated labeled production line images to generate the plurality of transformed training production line images.

Returning to FIG. 4, at step/operation 404, the predictive data analysis computing entity 106 generates the categorical validation machine learning model based at least in part on the plurality of transformed training production line images. In some embodiments, the predictive data analysis computing entity 106 trains the categorical validation machine learning model as a machine learning model that is configured to process feature data associated with an input production line image in order to generate a validation prediction about whether the input production line image is an image of a production line item associated with a corresponding target validation category.

In some embodiments, a categorical validation machine learning model is a machine learning model that is configured to determine whether an input production line image corresponds to a target validation category that is associated with the categorical validation machine learning model. In some embodiments, the categorical validation machine learning model is configured to process at least one of the production line image (e.g., as a matrix), extracted image-based features values associated with the input production line image (e.g., as a vector), and one or more physical production attributes for the input production line image (as a vector), in order to determine a validation prediction for the input production line image that describes whether an input production line image corresponds to a target validation category that is associated with the categorical validation machine learning model. In some embodiments, the output of a categorical validation machine learning model is a vector.

In some embodiments, the categorical validation machine learning model comprises a convolutional neural network, such as a binary classification convolutional neural network that is characterized by at least one of the following: five total layers comprised of four two-dimensional convolutional layers and one flattening layer, where filters are increased across two-dimensional convolutional layers to capture patterns and details in the input production line image, and where each two-dimensional convolutional layer utilizes a rectified linear unit (ReLU) activation function. In some embodiments, each two-dimensional convolution operation in a two-dimensional convolutional layer is followed by a pooling operation (e.g., with a size and stride of two), where dropout values are increased across two-dimensional convolutional layers to a maximum value (e.g., a maximum value of 0.7). In some embodiments, the categorical validation machine learning model is trained using a binary cross-entropy loss function, with constant label smoothing (e.g., constant label smoothing at 0.1 to train the model with mislabeled data and with improved overall robustness and accuracy). In some embodiments, to train the categorical validation machine learning model, an optimization function such as Adam Optimizer function or a Stochastic gradient descent optimizer function is utilized. While various embodiments of the present invention describe that the categorical validation machine learning model comprises a convolutional neural network, a person of ordinary skill in the relevant technology will recognize that any machine learning model (e.g., any neural network, such as any pre-trained neural network) may be utilized as part of the categorical validation machine learning model.

In some embodiments, step/operation 404 may be performed in accordance with the process that is depicted in FIG. 9, which is an example process of using a training production line image to update parameters of the categorical validation machine learning model. The process that is depicted in FIG. 9 begins at step/operation 901 when the predictive data analysis computing entity 106 processes the training production line image using the categorical validation machine learning model to determine an affirmative category likelihood for the training production line image and a negative category likelihood for the training production line image. In some embodiments, processing the training production line image using the categorical validation machine learning model comprises processing extracted image-based features for the training production line image and one or more physical production attributes for the training production line image.

In general, an extracted image-based feature may describe an extracted feature of a production line image that is extracted from the image data of the production line image. Examples of extracted image-based features include key point descriptors for the production line image, such as key point descriptors generated by decomposing the production line image to key points that represent a unique feature (e.g., using BRISK feature detection techniques that decompose the production line image to key points that represent a unique feature defined in a 128-vector descriptor). Exemplary techniques for generating key point descriptors for production line images are described in Zheng et al., *An Algorithm for Accuracy Enhancement of License Plate Recognition*, Journal of Computer and System Sciences (2013), available online at https://www.sciencedirect.com/science/article/pii/S0022000012001018.

A physical production attribute may describe any property associated with production of the production line associated with a production line image. Examples of physical production attributes include a pharmacy site location identifier associated with a pharmacy site of a puck container, a fill line number associated with a fill line of a puck container, a camera identifier for a camera device used to capture a production line image of a puck container, attributes describing one or more camera/flash settings for a camera device used to capture a production line image of a puck container, attributes describing date and/or time of capture of a production line image of a puck container, and/or the like.

The affirmative category likelihood for the training production line image may describe a value generated by the categorical validation machine learning model that describes a likelihood that a production line image provided as an input to the categorical validation machine learning model (e.g., during training, a training production line image) corresponds to a validation category associated with the categorical validation machine learning model. The negative category likelihood for the training production line image may describe a value generated by the categorical validation machine learning model that describes a likelihood that a production line image provided as an input to the categorical validation machine learning model (e.g., during training, a training production line image) does not correspond to a validation category associated with the categorical validation machine learning model. In some embodiments, the affirmative category likelihood and the negative category likelihood are processed using a likelihood smoothing transformation to determine a smoothed affirmative likelihood and a smoothed negative category likelihood.

At step/operation 902, the predictive data analysis computing entity 106 processes the affirmative category likelihood and the negative category likelihood using a likelihood smoothing transformation to determine a smoothed affirmative likelihood and a smoothed negative category likelihood. The likelihood smoothing transformation may be configured to adjust the affirmative category likelihood and the negative category likelihood using class weights that represent expected likelihoods of observation of affirmative association of input production line images with the validation category for the categorical validation machine learning model and negative association of input production line images with the validation category for the categorical validation machine learning model. For example, the likelihood smoothing transformation may comprise a log functions that apply logarithmic operations based at least in part on the noted class weights (e.g., with mu tuning for the noted log functions set to a defined value, such as to 0.15).

At step/operation 903, the predictive data analysis computing entity 106 updates the parameters of the categorical validation machine learning model based at least in part on the smoothed affirmative category likelihood and the smoothed negative category likelihood. In some embodiments, the parameters of the categorical validation machine learning model are updated in a manner that is configured to minimize a loss function determined based at least in part on a measure of deviation of the smoothed affirmative category likelihood and the smoothed negative category likelihood with a ground-truth label for the training production line image, where the ground-truth label describes whether the training production line image is associated with the validation category that is associated with the categorical validation machine learning model.

Once trained, categorical validation machine learning models enable efficiently and reliably performing conformance monitoring of a production line in order to determine defective/non-conformant production line items. By enabling conformance monitoring of a production line, various embodiments of the present invention reduce the cost to production line control systems resulting from manual conformance monitoring and remove the need for operations needed to enable human agents to perform manual conformance monitoring. Moreover, by enabling conformance monitoring of a production line, various embodiments of the present invention reduce or remove the need for operations needed to address the presence of defective products resulting from unreliable conformance monitoring of the production line, such as operations needed to enable human agents to perform manual conformance monitoring of later-stage products that exist in a production process after the production line. By enabling the noted functionalities and associated advantages, various embodiments of the present invention reduce the operational load on production line control systems and thus improve the operational efficiency and the operational reliability of the noted production line control systems.

Model Inference Operations

FIG. 10 is a flowchart diagram of an example process 1000 for generating a validation prediction for an input production line image with respect to a validation category by using a trained categorical validation machine learning model that is associated with the validation category. While various embodiments of the present invention describe generating a categorical validation machine learning model as being performed by the same computing entity as the computing entity used to generate validation predictions by a categorical validation machine learning model, a person of ordinary skill in the relevant technology will recognize that in some embodiments a first set of one or more computing entities may generate a categorical validation machine learning model and a second set of one or more computing entities may generate the validation prediction by utilizing the categorical validation machine learning model.

The process 1000 begins at step/operation 1001 when the predictive data analysis computing entity 106 identifies one or more physical production attributes for the input production line image. As described above, a physical production attribute may describe any property associated with production of the production line associated with a production line image. Examples of physical production attributes include a pharmacy site location identifier associated with a pharmacy site of a puck container, a fill line number associated with a fill line of a puck container, a camera identifier for a camera device used to capture a production line image of a puck container, attributes describing one or more camera/flash settings for a camera device used to capture a production line image of a puck container, attributes describing date and/or time of capture of a production line image of a puck container, and/or the like.

At step/operation 1002, the predictive data analysis computing entity 106 processes the one or more physical production attributes for the input production line image and the input production line image using the categorical validation machine learning model to generate a validation prediction for the input production line image. In some embodiments, the categorical validation machine learning model comprises a binary classifier convolutional neural network. In some embodiments, the categorical validation machine learning model is generated using a non-blurry subset of the plurality of training production line images (e.g., a non-blurry subset that additionally and/or optionally includes images that satisfy a predefined brightness threshold).

As described above, a categorical validation machine learning model may be a machine learning model that is configured to determine whether an input production line image corresponds to a target validation category that is associated with the categorical validation machine learning model. In some embodiments, the categorical validation machine learning model is configured to process at least one of the production line image, extracted image-based features values associated with the input production line image, and one or more physical production attributes for the input production line image, in order to determine a validation prediction for the input production line image that describes whether an input production line image corresponds to a target validation category that is associated with the categorical validation machine learning model. In some embodiments, the categorical validation machine learning model comprises a convolutional neural network, such as a binary classification convolutional neural network that is characterized by at least one of the following: five total layers comprised of four two-dimensional convolutional layers and one flattening layer, where filters are increased across two-dimensional convolutional layers to capture patterns and details in the input production line image, and where each two-dimensional convolutional layer utilizes a rectified linear unit (ReLU) activation function. In some embodiments, each two-dimensional convolution operation in a two-dimensional convolutional layer is followed by a pooling operation (e.g., with a size and stride of two), where dropout values are increased across two-dimensional convolutional layers to a maximum value (e.g., a maximum value of 0.7). In some embodiments, the categorical validation machine learning model is trained using a binary cross-entropy loss function, with constant label smoothing (e.g., constant label smoothing at 0.1 to train the model with mislabeled data and with improved overall robustness and accuracy). In some embodiments, to train the categorical validation machine learning model, an optimization function such as Adam Optimizer function or a Stochastic gradient descent optimizer are utilized. While various embodiments of the present invention describe that the categorical validation machine learning model comprises a convolutional neural network, a person of ordinary skill in the relevant technology will recognize that any machine learning model (e.g., any neural network, such as any pre-trained neural network) may be utilized as part of the categorical validation machine learning model.

In some embodiments, a validation prediction describes a conclusion about whether a corresponding production line image that is associated with the validation prediction is associated with a corresponding validation category. For example, the validation prediction may describe a likelihood that a corresponding production line image that is associated with the validation prediction describes a production line item for a validation category that is associated with the validation prediction, a likelihood that a corresponding production line image that is associated with the validation prediction does not describe a production line item for a validation category that is associated with the validation prediction, and/or the like. In some embodiments, a validation prediction describes at least one of an affirmative category likelihood for the production line image and a negative category likelihood for the production line image. In some embodiments, a validation prediction describes at least one of a smoothed affirmative likelihood for the production line image and a smoothed negative category likelihood for the production line image. The affirmative category likelihood for the training production line image may describe a value generated by the categorical validation machine learning model that describes a likelihood that a production line image provided as an input to the categorical validation machine learning model (e.g., during training, a training production line image) corresponds to a validation category associated with the categorical validation machine learning model. The negative category likelihood for the training production line image may describe a value generated by the categorical validation machine learning model that describes a likelihood that a production line image provided as an input to the categorical validation machine learning model (e.g., during training, a training production line image) does not correspond to a validation category associated with the categorical validation machine learning model. In some embodiments, the affirmative category likelihood and the negative category likelihood are processed using a likelihood smoothing transformation to determine a smoothed affirmative likelihood and a smoothed negative category likelihood.

At step/operation 1003, the predictive data analysis computing entity 106 performs one or more prediction-based actions based at least in part on the validation prediction. In some embodiments, performing the one or more prediction-based actions comprises determining whether the validation prediction satisfies a validation prediction threshold, and, in response to determining that the validation prediction satisfies the validation prediction threshold, causing a production line software to perform one or more production line control actions based at least in part on one or more process control parameters associated with the validation category.

In some embodiments, step/operation 1003 may be performed in accordance with the process that is depicted in FIG. 11. The process that is depicted in FIG. 11 begins at step/operation 1101 when the predictive data analysis computing entity 106 retrieves a process control database that describes a validation prediction threshold for the validation category and one or more process control parameters for the validation category. The process control database may describe, for each validation category of a set of defined validation categories, the validation prediction threshold for the validation category and the one or more process control parameters for the validation category, where the validation prediction threshold for the validation category may describe a condition that, when satisfied by the validation prediction for a production image line image with respect to the validation category, causes performance of one or more production line control actions based at least in part on one or more process control parameters associated with the validation category.

For example, the validation prediction threshold may recommend that, when a validation prediction for a production lime image with respect to a corresponding validation category exceeds a particular numeric value, the one or more production line control actions for the corresponding validation category should be performed. As another example, the validation prediction threshold may recommend that, when a validation prediction for a production lime image with respect to a corresponding validation category falls below a particular numeric value, the one or more production line control actions for the corresponding validation category should be performed. An exemplary process control action may be triggering an exception that causes a production line item associated with a production line image to be diverted to a human inspector. Another exemplary process control action may be triggering an exception that causes a production line item associated with a production line image to be diverted to a human inspector and a user interface depicting the production line image to be presented to the human inspector. A yet another process control action may be triggering an exception that causes a production line item associated with a production line image to be diverted to a human inspector, and a user interface depicting the production line image as well as the physical production attributes of the production line image to be presented to the human inspector.

In some embodiments, the process control database may describe, for each validation category of a set of defined validation categories, specific image transformation requirements and measurement parameters associated with the validation category, such as properties associated with the crop, enhancement, and measurement transformations for the validation category. In some embodiments, the process control database may describe data associated with each validation category in a row of a relational database, where the row is associated with the validation category. In some embodiments, the process control database may describe data associated with each validation category in a column of a relational database, where the column is associated with the validation category.

At step/operation 1102, the predictive data analysis computing entity 106 determines whether the validation prediction satisfies the validation prediction threshold described by the process control database for the validation category. At step/operation 1103, in response to determining that the validation prediction satisfies the validation prediction threshold, the predictive data analysis computing entity 106 performs one or more one or more production line control actions based at least in part on one or more process control parameters associated with the validation category as described by the process control database. At step/operation 1104, in response to determining that the validation prediction fails to satisfy the validation prediction threshold, the predictive data analysis computing entity 106 does not perform the one or more one or more production line control actions.

In some embodiments, performing the process control actions includes generating an action signal for the input production line image, such as generating an action signal on a commercial pharmacy production fill line after the vial has been filled. The action signal may represent an exception signal, a no exception signal, or an error signal. In some embodiments, an internet browser-based interface is provided to maintain and update values in the process control database. This interface may enable a pharmacy operations team to dynamically tune the number of exceptions produced for review by a human pharmacist as it allows them to change the thresholding parameters and rules that generate exceptions in near real time.

Accordingly, as described above, categorical validation machine learning models enable efficiently and reliably performing conformance monitoring of a production line in order to determine defective/non-conformant production line items. By enabling conformance monitoring of a production line, various embodiments of the present invention reduce the cost to production line control systems resulting from manual conformance monitoring and remove the need for operations needed to enable human agents to perform manual conformance monitoring. Moreover, by enabling conformance monitoring of a production line, various embodiments of the present invention reduce or remove the need for operations needed to address the presence of defective products resulting from unreliable conformance monitoring of the production line, such as operations needed to enable human agents to perform manual conformance monitoring of later-stage products that exist in a production process after the production line. By enabling the noted functionalities and associated advantages, various embodiments of the present invention reduce the operational load on production line control systems and thus improve the operational efficiency and the operational reliability of the noted production line control systems.

In some embodiments, after an initial evaluation of a vial is completed, a proposed system and/or a human agent empties the vial, then refills the vial, and then repeats the evaluation. In some embodiments, all of the thresholds described herein may be optimized using specific techniques including by using relative economics involved in the costs of a false positive and a false negative. In some embodiments, categorical validation machine learning models may be retrained using evaluation results (e.g., model predictions and/or human evaluation results) to improve prediction results. In some embodiments, a proposed system evaluates crops of the same vial to detect foreign bodies or instances of incorrect pills in otherwise correctly filled vials, and causes an exception when a "foreign object" (e.g., a loose screw from the machinery or a piece of lint) is detected in a production line image using a new exception type in addition to the exception types described above.

In some embodiments, performing the prediction-based actions comprises identifying a second input production line image of a production line item after emptying of the production line image and refilling of the production line image; determining a second validation determination based at least in part on the second production line image; and performing one or more second prediction-based actions based at least in part on the second validation prediction. In some embodiments, performing the prediction-based actions comprises determining a foreign object validation prediction for the input production line image; and determining whether to generate a foreign object exception based on the foreign object validation prediction. In some embodiments, performing the prediction-based actions comprises determining an incorrect pill validation prediction for the input production line image; and determining whether to generate an incorrect pill exception based on the incorrect pill validation prediction.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
   determining, by one or more processors, a plurality of image attributes and a validation category for an input production line image, wherein: (i) the plurality of image attributes comprises a product type identifier for the input production line image and a physical production attribute for the input production line image, and (ii) the validation category is characterized by a defined subset of the plurality of image attributes;
   determining, by the one or more processors, based at least in part on the physical production attribute, and by utilizing a categorical validation machine learning model that is associated with the validation category, a validation prediction for the input production line image, wherein (i) the categorical validation machine learning model is generated using a transformed training production line image associated with the validation category, and (ii) the transformed training production line image is generated by (a) determining an image transformation for a training production line image based at least in part on the validation category and (b) applying the image transformation to the training production line image to generate the transformed training production line image; and
   initiating, by the one or more processors, a prediction-based action based at least in part on the validation prediction.
2. The computer-implemented method of claim 1, wherein the categorical validation machine learning model comprises a binary classifier convolutional neural network.
3. The computer-implemented method of claim 1, wherein the training production line image is one of a non-blurry subset of a plurality of training production line images that satisfy a predefined brightness threshold.
4. The computer-implemented method of claim 3, wherein the validation category is one of a plurality of validation categories, the plurality of training production line images is associated with a related category subset of the plurality of validation categories, and the method further comprises:
   determining a color channel statistical distribution vector for the validation category based at least in part on a labeled production line image for the validation category;
   determining, based at least in part on the color channel statistical distribution vector, a neighboring category subset of the plurality of validation categories;
   determining a plurality of shape descriptor data objects for the neighboring category subset of the plurality of validation categories; and
   determining the related category subset based at least in part on the plurality of shape descriptor data objects.

5. The computer-implemented method of claim 1, wherein applying the image transformation to the training production line image to generate the transformed training production line image comprises performing a center crop operation on the training production line image to generate a cropped training production line image.

6. The computer-implemented method of claim 5, wherein applying the image transformation to the training production line image to generate the transformed training production line image comprises performing a sliding window intelligent crop operation on the cropped training production line image to generate a lightness-corrected training production line image.

7. The computer-implemented method of claim 1, wherein the categorical validation machine learning model is generated by:
processing the transformed training production line image using the categorical validation machine learning model to determine an affirmative category likelihood for the transformed training production line image and a negative category likelihood for the transformed training production line image;
processing the affirmative category likelihood and the negative category likelihood using a likelihood smoothing transformation to determine a smoothed affirmative category likelihood and a smoothed negative category likelihood; and
generating the categorical validation machine learning model based at least in part on the smoothed affirmative category likelihood and the smoothed negative category likelihood.

8. The computer-implemented method of claim 1, wherein, to generate the transformed training production line image, the method further comprises:
determining whether an initial labeled image count of a set of initially transformed labeled training production line images satisfies a labeled image count threshold; and
in response to determining that the initial labeled image count fails to satisfy the labeled image count threshold, performing a sliding window operation across a transformed labeled training production line image of the set of initially transformed labeled training production line images to generate an augmented labeled production line image;
determining whether an augmented labeled image count of a plurality of augmented labeled production line images satisfies the labeled image count threshold;
in response to determining that the augmented labeled image count fails to satisfy the labeled image count threshold, performing a translation or rotation operation on the augmented labeled production line image to generate translated or rotated labeled production line images until a combined count of the plurality of augmented labeled production line images and a plurality of translated or rotated labeled production line images satisfies the labeled image count threshold; and
generating the transformed training production line image based at least in part on the plurality of augmented labeled production line images and the plurality of translated or rotated labeled production line images.

9. The computer-implemented method of claim 1, wherein determining the validation prediction comprises:
determining an initial validation score based at least in part on an output of the categorical validation machine learning model;
determining an adjusted validation score based at least in part on adjusting the initial validation score using a false positive penalty weight and a false negative penalty weight; and
determining the validation prediction based at least in part on the adjusted validation score.

10. The computer-implemented method of claim 1, further comprising:
identifying, by the one or more processors, a second input production line image of a production line item after emptying of the input production line image and refilling of the input production line image;
determining, a second validation determination based at least in part on the second input production line image; and
performing a second prediction-based action based at least in part on a second validation prediction.

11. The computer-implemented method of claim 1, further comprising:
determining a foreign object validation prediction for the input production line image; and
determining whether to generate a foreign object exception based at least in part on the foreign object validation prediction.

12. The computer-implemented method of claim 1, further comprising:
determining an incorrect pill validation prediction for the input production line image; and
determining whether to generate an incorrect pill exception based at least in part on the incorrect pill validation prediction.

13. A system comprising:
one or more processors; and
at least one memory storing processor-executable instructions that, when collectively or independently executed by any one or more of the one or more processors, comprise causing the one or more processors to:
determine a plurality of image attributes and a validation category for an input production line image, wherein: (i) the plurality of image attributes comprises a product type identifier for the input production line image and a physical production attribute for the input production line image, and (ii) the validation category is characterized by a defined subset of the plurality of image attributes;
determine, based at least in part on the physical production attribute and by utilizing a categorical validation machine learning model that is associated with the validation category, a validation prediction for the input production line image, wherein (i) the categorical validation machine learning model is generated using a transformed training production line image associated with the validation category, and (ii) the transformed training production line image is generated by (a) determining an image transformation for a training production line image based at least in part on the validation category and (b) applying the image transformation to the training production line image to generate the transformed training production line image; and
initiate a prediction-based action based at least in part on the validation prediction.

14. The system of claim 13, wherein, to generate the transformed training production line image, the one or more processors are further caused to:

determine whether an initial labeled image count of a set of initially transformed labeled training production line images satisfies a labeled image count threshold; and in response to a determination that the initial labeled image count fails to satisfy the labeled image count threshold, perform a sliding window operation across a transformed labeled training production line image of the set of initially transformed labeled training production line images to generate an augmented labeled production line image;

determine whether an augmented labeled image count of a plurality of augmented labeled production line images satisfies the labeled image count threshold;

in response to a determination that the augmented labeled image count fails to satisfy the labeled image count threshold, perform a translation or rotation operation on the augmented labeled production line image to generate translated or rotated labeled production line images until a combined count of the plurality of augmented labeled production line images and a plurality of translated or rotated labeled production line images satisfies the labeled image count threshold; and generate the transformed training production line image based at least in part on the plurality of augmented labeled production line images and the plurality of translated or rotated labeled production line images.

15. One or more non-transitory computer-readable storage media including instructions that, when executed by one or more processors, cause the one or more processors to:

determine a plurality of image attributes and a validation category for an input production line image, wherein: (i) the plurality of image attributes comprises a product type identifier for the input production line image and a physical production attribute for the input production line image, and (ii) the validation category is characterized by a defined subset of the plurality of image attributes;

determine, based at least in part on the physical production attribute and by utilizing a categorical validation machine learning model that is associated with the validation category, a validation prediction for the input production line image, wherein (i) the categorical validation machine learning model is generated using a transformed training production line image associated with the validation category, and (ii) the transformed training production line image is generated by (a) determining an image transformation for a training production line image based at least in part on the validation category and (b) applying the image transformation to the training production line image to generate the transformed training production line image; and initiate a prediction-based action based at least in part on the validation prediction.

16. The one or more non-transitory computer-readable storage media of claim 15, wherein, to generate the transformed training production line image, the one or more processors are further caused to:

determine whether an initial labeled image count of a set of initially transformed labeled training production line images satisfies a labeled image count threshold; and in response to a determination that the initial labeled image count fails to satisfy the labeled image count threshold, perform a sliding window operation across a transformed labeled training production line image of the set of initially transformed labeled training production line images to generate an augmented labeled production line image;

determine whether an augmented labeled image count of a plurality of augmented labeled production line images satisfies the labeled image count threshold;

in response to a determination that the augmented labeled image count fails to satisfy the labeled image count threshold, perform a translation or rotation operation on the augmented labeled production line image to generate translated or rotated labeled production line images until a combined count of the plurality of augmented labeled production line images and a plurality of translated or rotated labeled production line images satisfies the labeled image count threshold; and generate the transformed training production line image based at least in part on the plurality of augmented labeled production line images and the plurality of translated or rotated labeled production line images.

* * * * *

UNITED STATES PATENT AND TRADEMARK OFFICE
CERTIFICATE OF CORRECTION

PATENT NO. : 12,272,044 B2
APPLICATION NO. : 17/475987
DATED : April 8, 2025
INVENTOR(S) : Thomas R. Gilbertson et al.

It is certified that error appears in the above-identified patent and that said Letters Patent is hereby corrected as shown below:

In the Claims

In Column 38, Line 14, Claim 10, delete "determining," and insert -- determining --, therefor.

Signed and Sealed this
First Day of July, 2025

Coke Morgan Stewart
*Acting Director of the United States Patent and Trademark Office*